United States Patent
Wang et al.

(10) Patent No.: US 10,453,204 B2
(45) Date of Patent: Oct. 22, 2019

(54) IMAGE ALIGNMENT FOR BURST MODE IMAGES

(71) Applicant: Adobe Inc., San Jose, CA (US)

(72) Inventors: Zhaowen Wang, San Jose, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 138 days.

(21) Appl. No.: 15/676,903

(22) Filed: Aug. 14, 2017

(65) Prior Publication Data

US 2018/0158199 A1 Jun. 7, 2018

Related U.S. Application Data

(60) Provisional application No. 62/430,709, filed on Dec. 6, 2016.

(51) Int. Cl.
*G06T 7/33* (2017.01)
*G06K 9/62* (2006.01)
(Continued)

(52) U.S. Cl.
CPC ............ *G06T 7/33* (2017.01); *G06K 9/00261* (2013.01); *G06K 9/4604* (2013.01);
(Continued)

(58) Field of Classification Search
CPC . G06T 5/002; G06T 5/50; G06T 2207/10024; G06T 2207/10016;
(Continued)

(56) References Cited

U.S. PATENT DOCUMENTS 6,211,913 B1 * 4/2001 Hansen .............. H04N 5/23248
   348/218.1
6,658,168 B1 * 12/2003 Kim ..................... G06K 9/4647
   382/165

(Continued)

FOREIGN PATENT DOCUMENTS

WO WO 2018/022197 A1 2/2018

OTHER PUBLICATIONS

Combined Search and Examination Report as received in GB 1716295.9 dated Apr. 5, 2018.
(Continued)

*Primary Examiner* — Ali Bayat
(74) *Attorney, Agent, or Firm* — Keller Jolley Preece

(57) ABSTRACT

The present disclosure is directed towards systems and methods for generating a new aligned image from a plurality of burst image. The systems and methods subdivide a reference image into a plurality of local regions and a subsequent image into a plurality of corresponding local regions. Additionally, the systems and methods detect a plurality of feature points in each of the reference image and the subsequent image and determine matching feature point pairs between the reference image and the subsequent image. Based on the matching feature point pairs, the systems and methods determine at least one homography of the reference image to the subsequent image. Based on the homography, the systems and methods generate a new aligned image that is that is pixel-wise aligned to the reference image. Furthermore, the systems and methods refines boundaries between local regions of the new aligned image.

19 Claims, 17 Drawing Sheets

(51) Int. Cl.
*G06T 5/50* (2006.01)
*G06T 3/00* (2006.01)
*G06K 9/46* (2006.01)
*G06K 9/00* (2006.01)
*G06T 5/00* (2006.01)
*G06K 9/32* (2006.01)

(52) U.S. Cl.
CPC ......... *G06K 9/4671* (2013.01); *G06K 9/6202* (2013.01); *G06K 9/6211* (2013.01); *G06T 3/0068* (2013.01); *G06T 3/0093* (2013.01); *G06T 5/002* (2013.01); *G06T 5/50* (2013.01); *G06K 2009/3291* (2013.01); *G06T 2207/10016* (2013.01); *G06T 2207/20016* (2013.01); *G06T 2207/20021* (2013.01); *G06T 2207/20182* (2013.01); *G06T 2207/20221* (2013.01)

(58) Field of Classification Search
CPC . G06T 2207/20016; G06T 2207/20021; G06T 2207/20182; G06T 2207/20221; G06T 7/246; G06T 7/33; G06T 7/30; G06T 3/0068; G06T 3/0093; G06K 9/00261; G06K 9/4604; G06K 9/4671; G06K 9/6202; G06K 9/6211; G06K 2209/3291
USPC ........................................................ 382/294
See application file for complete search history.

(56) References Cited

U.S. PATENT DOCUMENTS

| 8,897,598 | B1 | 11/2014 | Ziegler et al. | |
|---|---|---|---|---|
| 9,594,980 | B1* | 3/2017 | Graham | H04N 5/23222 |
| 2013/0004079 | A1* | 1/2013 | Yamada | G06K 9/4642 382/190 |
| 2014/0293016 | A1* | 10/2014 | Benhimane | G06T 17/00 348/50 |
| 2015/0195565 | A1* | 7/2015 | Jeong | H04N 19/51 375/240.12 |
| 2015/0229840 | A1* | 8/2015 | Sawai | G06T 3/4038 348/36 |
| 2016/0150211 | A1* | 5/2016 | Hwang | G06T 3/0093 348/43 |

OTHER PUBLICATIONS

Liu, Ziwei, Lu Yuan, Xiaoou Tang, Matt Uyttendaele, and Jian Sun. "Fast burst images denoising." ACM Transactions on Graphics (TOG) 33, No. 6 (2014): 232.

Rublee, Ethan, Vincent Rabaud, Kurt Konolige, and Gary Bradski. "ORB: An efficient alternative to SIFT or SURF." In 2011 International conference on computer vision, pp. 2564-2571. IEEE, 2011.

* cited by examiner

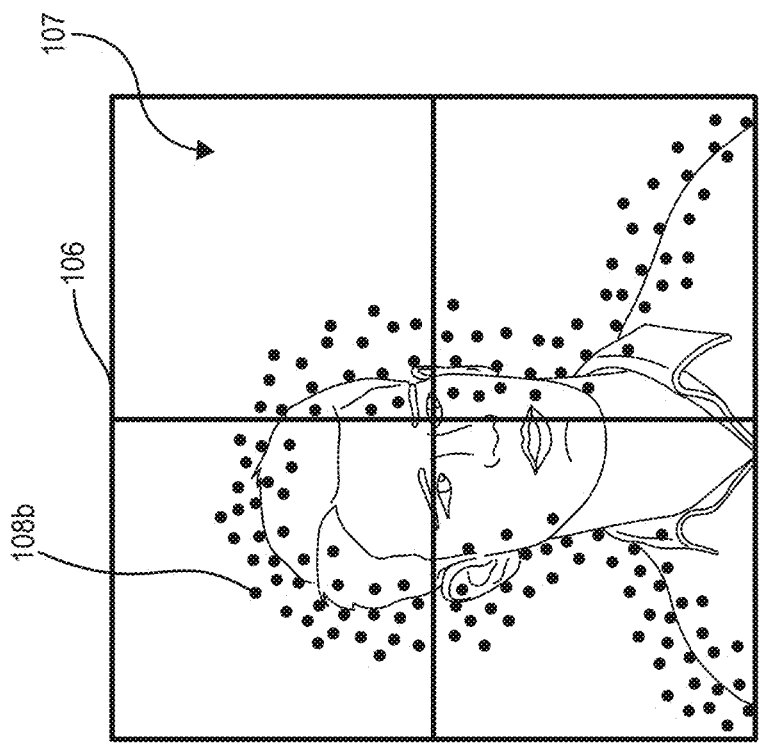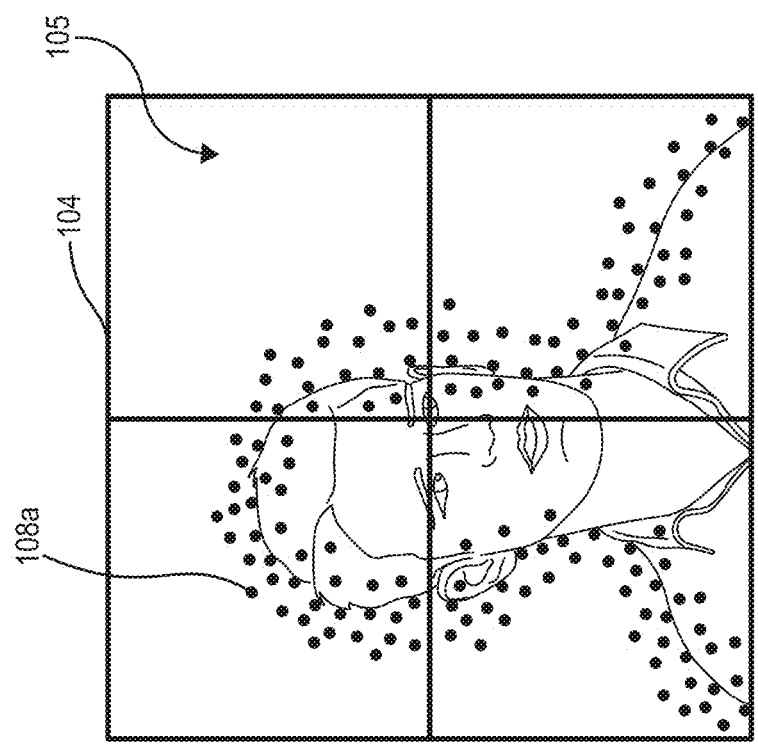
FIG. 2

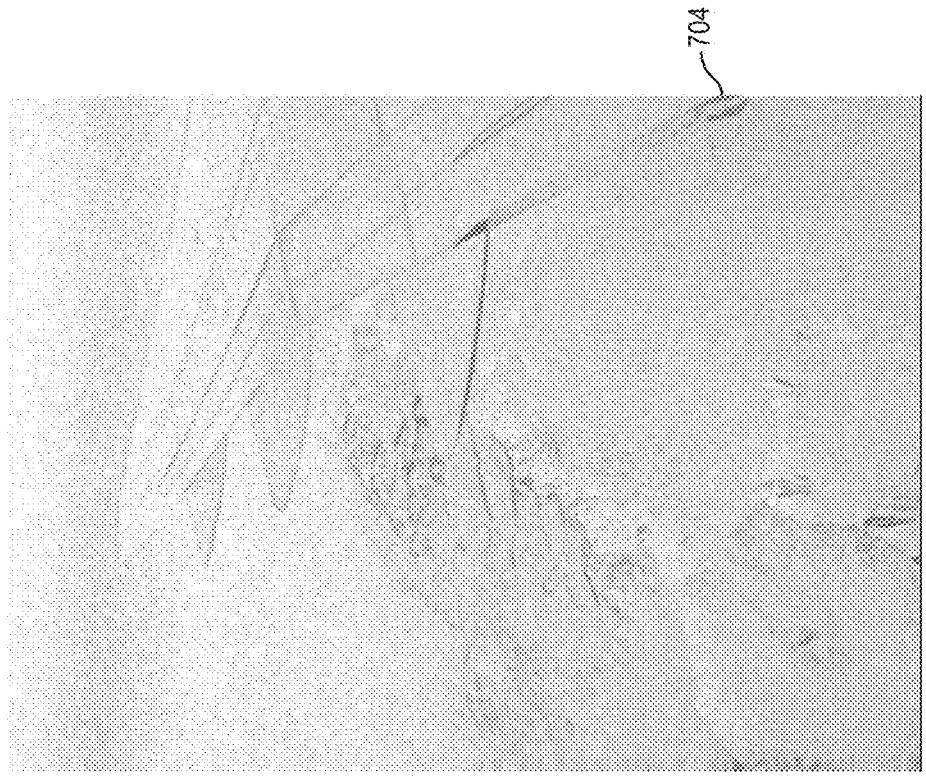
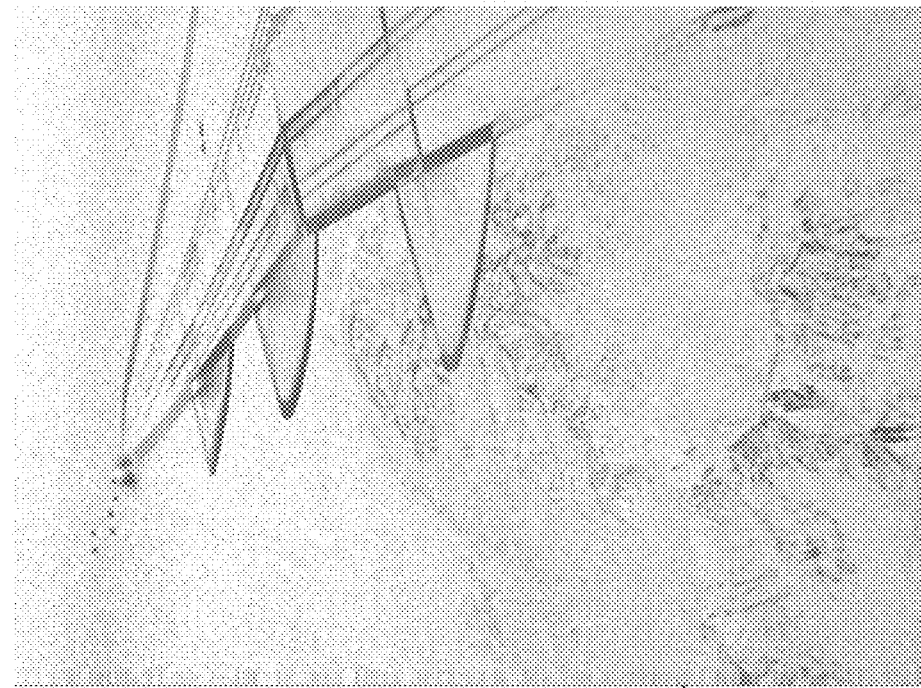
FIG. 7

IMAGE ALIGNMENT FOR BURST MODE IMAGES

CROSS REFERENCE TO RELATED APPLICATIONS

This application claims the priority to and the benefit of U.S. Provisional Patent Application No. 62/430,709, filed Dec. 6, 2016, which is incorporated herein by reference in its entirety.

BACKGROUND

Burst mode image capturing (e.g., capturing several sequential images in a relatively short period of time) is available with various types of image capturing devices (e.g., digital cameras, mobile phones, etc.). By capturing multiple images in a short period of time, a user can conventionally select an image from the burst images having the highest quality or best timing. However, in some instances, one of the images will have the highest quality while another has the best timing. In other instances, none of the images have great quality. Moreover, the burst images can exhibit deficiencies in lighting and significant blurring.

Some efforts have been made to fuse (e.g., merge) multiple images of the burst images in order to remove noise (i.e., random variations of brightness and/or color information) from the burst images or to form a single image without noise. Such conventional systems typically only function properly when local motions are consistent (e.g., motion throughout the burst images is consistent), and if this assumption does not hold (due to camera deformation or a 3D view change), an accuracy of local motion estimation (essential for fusing the multiple images) degrades. As a result, the image systems conventionally do not yield higher quality images than the burst images. Additional efforts have been made in regard to image alignment (e.g., aligning burst images with each other) and providing a new aligned image from the aligned image. However, such image systems conventionally operate offline and require significant processing power and memory. As a result, the image systems are not suitable for real-time mobile applications (e.g., mobile phone applications).

Accordingly, these and other disadvantages exist with respect to conventional systems.

BRIEF SUMMARY

The various embodiments described below provide benefits and/or solve one or more of the foregoing or other problems in the art with systems and methods for generating an image from a plurality of burst images with enhanced quality. In particular, the systems and methods provide for generating a single image (e.g., an overall higher quality image) from the plurality of burst images that captures the moment (i.e., the timing) of the burst images while achieving a quality level of typical non-burst mode images. Specifically, the systems and methods provide for efficiently compensating for translation, rotation, and scaling that may exhibited in a plurality of burst images and generating a new aligned image that exhibits a higher quality than the quality exhibited by any of the burst images individually. Moreover, the systems and methods provide for efficiently generating the new aligned image on a mobile device, such as, a mobile phone.

In one or more embodiments, the systems and methods subdivide a reference image and a subsequent image of the burst images into a plurality of local regions and detect feature points in each of the local regions. Furthermore, the systems and methods match feature points between the reference image and the subsequent image according to the local regions. Based on the matching feature points, the systems and methods determine a homography (i.e., a motion transformation) that enables the systems and methods to warp the subsequent image and generate a higher quality new aligned image that is pixel-wise aligned to the reference image. Accordingly, because the systems and methods subdivide the reference image and the subsequent image into local regions and detect feature points based on the local regions, the systems and methods determine a more accurate homography, which results in a higher quality new aligned image in comparison to conventional systems.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 2 illustrates a reference image and a subsequent image of a plurality of burst images, the reference image and the subsequent image having a plurality of detected feature points in accordance with one or more embodiments;

FIG. 7 illustrates a comparison of alignment errors produced by globally applying a homography motion model to an image and alignment errors produced by individually applying a homography to each local region of the image according to one or more embodiments of the present disclosure;

DETAILED DESCRIPTION

Figure 1:
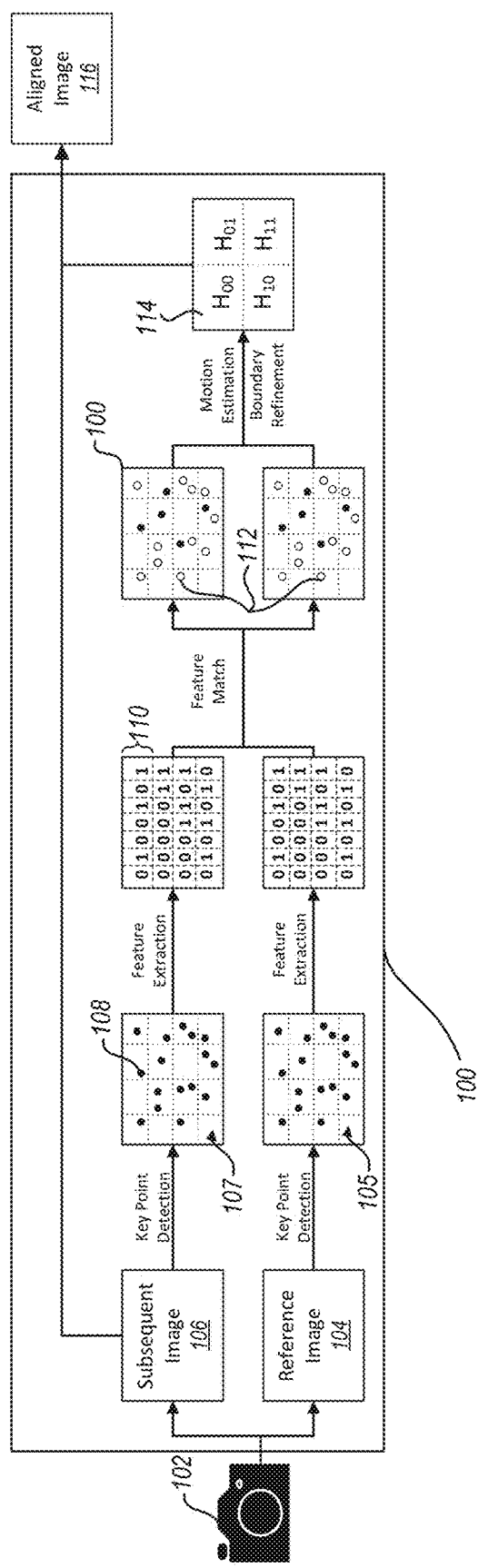
FIG. 1 illustrates a sequence-flow diagram of generating a new aligned image from a plurality of burst images in accordance with one or more embodiments.

The various embodiments described herein provide an image alignment system for generating a new aligned image from a plurality of burst images. For example, the image alignment system can generate a new aligned image from the plurality of burst images that has a higher quality (e.g., higher resolution, better lighting, less noise, less blur, etc.) than any of the individual burst images of the plurality of burst image. In some embodiments, the image alignment system subdivides images of the plurality of burst images into a plurality of local regions and applies a homography motion model to each local region of the plurality of local regions. In additional embodiments, the image alignment system matches key feature points between images of the plurality of burst images according to the feature points' respective local region. In one or more embodiments, the image alignment system utilizes a bottom-up hierarchical approach to determining the homographies of the images. In further embodiments, the image alignment system refines boundaries of the local regions of the images while generating the new aligned image in order to decrease image deformation caused by inconsistent location motion warping. Each of the foregoing is discussed in further detail below.

In some embodiments, the image alignment system subdivides images of the plurality of burst images into a plurality of local regions and applies a homography motion model to each local region of the plurality of local regions. Specifically, the image alignment system subdivides a reference image and a subsequent image of the plurality of burst images into a plurality of local regions and plurality of corresponding local regions, respectively. Furthermore, the image alignment system applies a homography motion model to each of the local regions and respective corresponding local regions individually to determine a homography of each local region of the reference image to its respective corresponding local region of the subsequent image. Additionally, as will be discussed in greater detail below, based on the determined homographies, the image alignment system generates the new higher quality image.

Because the image alignment system subdivides the reference image and the subsequent image into local regions and corresponding local regions and applies homography motion models to each of the local regions individually (e.g., determine local motion for the local regions), the image alignment system of the present disclosure determines more accurate overall motion estimation (i.e., a more accurate homography) of the reference image to the subsequent image in comparison to conventional systems, which conventionally apply a global homography motion model to the entire reference and subsequent images. Specifically, the image alignment system of the present disclosure determines a more accurate homography for each local region, which results in a more accurate overall homography for the entire image.

As noted above, in additional embodiments, the image alignment system matches feature points between images (i.e., the reference image and the subsequent image) of the plurality of burst images according to the feature points' respective local regions. Specifically, the image alignment system detects feature points in each of the local regions and corresponding local regions individually. Furthermore, given that a local region includes a threshold number of (e.g., 100) feature points, the image alignment system detects the threshold number of feature points in each local region and corresponding local region.

Additionally, the image alignment system matches feature points between a given local region and its corresponding local region by predicting a pixel location of a given feature point within the local region. Upon predicting the pixel location of the feature point within the local region, the image alignment system utilizes a k-nearest process to select a top few potentially matching feature points. Furthermore, the image alignment system determines similarities between the given feature point and any potentially matching feature points. In some embodiments, the image alignment system determines similarities between feature points based on a Hamming distance between descriptors of the feature points. The image alignment system filters any pairs of the given feature point and potentially matching feature points having descriptor distances above a predetermined amount (e.g., 80). Moreover, the image alignment system determines a median displacement vector of all remaining pairs of feature points, and filters any pairs of the given feature point and potentially matching feature points having a displacement that deviates form the median displacement vector by more than a predetermined number pixels.

Because the image alignment system detects feature points in each of the local regions and corresponding local regions individually instead of just detecting feature points globally, the image alignment system of the present disclosure achieves a more evenly distributed number of detected feature points in comparison to conventional systems, which typically detect feature points globally. As a result of the foregoing, the image alignment system insures that each area of the images (i.e., the reference image and the subsequent image) is represented in the detected feature points instead of just areas having high concentrations of feature points.

Furthermore, because the image alignment system matches feature points from the reference image with feature points of the subsequent image based on local regions, the image alignment system of the present disclosure yields less matching errors than conventional systems, which typically match feature points globally. Moreover, as will be appreciated by one of ordinary skill in the art, by achieving less matching errors, the image alignment system will, ultimately, generate a higher quality new aligned image in comparison to conventional systems.

As mentioned briefly above, in one or more embodiments, the image alignment system utilizes a bottom-up approach to determining the homographies of the images. Specifically, the image alignment system determines whether a given local region at a lowest level of hierarchy (e.g., a smallest local region resulting from subdividing the images (e.g., $\frac{1}{16}^{th}$ portion of an image)) includes the threshold number (e.g., a predetermined number) of feature points to insure that an applied (e.g., fitted) homography motion model will provide an accurate homography of the local region. If the image alignment system determines that the given local region does not include the threshold number of (e.g., 100) feature points, the image alignment system can merge the given local region with other local regions until a resulting merged local region includes the threshold number of feature points. After merging the local regions, the image alignment system can apply a more robust homography motion model to the merged local region.

Because the image alignment system insures that the local regions to which the image alignment system applies homography motion models include a threshold number of feature points, the image alignment system insures that every portion of the reference image is represented in (e.g., accounted for) within the determined homography of the reference image. For example, in comparison to conventional systems, which determine homographies that are heavily based on (i.e., determined by) portions of the reference image that are rich in feature points, the image alignment system of the present disclosure insures that each area (i.e., local region) of the reference image is equally represented in the determined homography. Accordingly, the image alignment system of the present disclosure results in less alignment error when generating a new aligned image from the plurality of burst images in comparison to conventional systems.

Furthermore, because the image alignment system of the present disclosure utilizes the bottom-up approach to determining the homographies of the images as described above, the image alignment system provides improvements in the performance of a computer system. For example, because the image alignment system restricts feature matching to local regions and corresponding local regions, while assuming relatively small amounts of motion between images of burst images, the image alignment system reduces required processing power, memory, and communication resources needed to determine homographies of a first image (i.e., the reference image) of the plurality of burst images to a second image (i.e., the subsequent image) of the plurality of burst images. Furthermore, because image alignment system determines a homography of each local region independently, in comparison to conventional systems, which utilize known joint estimation methods, the image alignment system reduces required processing power, memory, and communication resources to determine a homography of a first image to a second image. Accordingly, the content analysis system results in less data transfer and data bandwidth usage for a computer/communication system. In other words, the image alignment system results in less required processing power and communication bandwidth in comparison to conventional systems. As a result, the image alignment system of the present disclosure, in comparison to conventional systems, is a more appropriate system for mobile devices, such as, a mobile phone.

Additionally, by fusing burst images (i.e., the reference image and the subsequent image) in the manner describe above, the image alignment system of the present disclosure enables additional noise reduction in comparison to conventional systems, facilitates utilizing high-dynamic-range ("HDR") with images, and moving and/or removing objects within the images.

As noted briefly above, in further embodiments, the image alignment system refines boundaries of local regions of the images while generating the new aligned image in order to decrease image deformation caused by inconsistent location motion warping. For example, along shared borders of local regions of the subsequent image, the image alignment system can adjust vector flows of pixels determined by respective homographies that are proximate to the shared borders. Furthermore, the image alignment system can adjust a location of contiguous corners of the subsequent image in order to compensate for inconsistent homographies between local regions.

FIG. 1 illustrates a sequence-flow diagram that an image alignment system 100 can utilize to generate a new aligned image 116 from a plurality of burst images according to one or more embodiments of the present disclosure. As illustrated, the image alignment system 100 receives a plurality of burst images from an image capturing device 102 (e.g., a standalone camera, a camera of a mobile device, etc.). As used herein the term "burst images" can refer to multiple sequential images captured in a relatively short period of time. For example, "burst images" can refer capturing several (e.g., ten, twenty, thirty, forty, etc.) images within a short period of time (e.g., 1 second, 2 seconds, 5 seconds, 10 seconds, etc.). In some embodiments, the image alignment system 100 includes the image capturing device 102 and any software associated with the image capturing device 102.

In response to receiving the plurality of burst images from the image capturing device 102, the image alignment system 100 selects a reference image 104 and a subsequent image 106 from the plurality of burst images to utilize to generate a new aligned image 116. For example, the image alignment system 100 can select a first image (i.e., the reference image 104) within the plurality of burst images and a second image (i.e., the subsequent image 106) that is sequentially after the first image (i.e., captured after the first image). In some embodiments, the image alignment system 100 can select the reference image 104 according to the image's quality. For example, the image alignment system 100 can select the highest quality image (e.g., having a highest resolution, a best lighting, the less noise, etc.) as the reference image 104. In alternative embodiments, the image alignment system 100 can select a first image in the plurality of burst images (i.e., a first image captured with the plurality of burst images) as the reference image 104. In yet further embodiments, as will be discussed in greater detail below, the image alignment system 100 can select an image having the most detected feature points 108 as the reference image 104. Furthermore, the image alignment system 100 can select any image that is subsequent to the selected reference image 104 as the subsequent image 106. Additionally, in some embodiments, the image alignment system 100 can select an image subsequent to the selected reference image 104 having the highest quality as the subsequent image 106. In one or more embodiments, the reference image 104 and the subsequent image 106 can include at least generally (e.g., at least substantially) the same scene.

Upon selecting the reference image 104 and the subsequent image 106, the image alignment system 100 subdivides the reference image 104 into a plurality of local regions 105 and the subsequent image 106 into a plurality of corresponding local regions 107. Specifically, each of the reference image 104 and the subsequent image 106 can define a respective image plane, and the image alignment system 100 can subdivide the image planes into the local regions 105 (e.g., different portions) and corresponding local regions 107. Furthermore, each local region of the plurality of local regions 105 of the reference image 104 may have (e.g., relate to) a corresponding local region of the plurality of corresponding local region. To facilitate explanation of the image alignment system 100 and the operation of the image alignment system 100, the local regions 105 of the reference image 104 and the corresponding local regions 107 of the subsequent image 106 can be referred to herein collectively as "local regions").

In some embodiments, the image alignment system 100 can subdivide the reference image 104 and the subsequent image 106 utilizing a spatial grid. In particular, the image alignment system 100 can subdivide the reference image 104 and the subsequent image 106 utilizing, for example, a 2×2 spatial grid, a 4×4 spatial grid, an 8×8 spatial grid, etc. In such embodiments, each of the local regions 105 and the corresponding regions can have at least generally a same shape and size. In alternative embodiments, the image alignment system 100 can subdivide the reference image 104 and the subsequent image 106 into irregular regions. For example, the local regions 105 of the reference image 104 can have inconsistent sizes and random shapes.

In addition to subdividing the reference image 104 and the subsequent image 106, the image alignment system detects feature points 108 in the reference image 104 and the subsequent image 106. For example, the image alignment system 100 can detect a plurality of feature points 108 in each of the reference image 104 and the subsequent image 106. In some instances, the image alignment system 100 detects a plurality of feature points 108 in each of the local regions 105 of the plurality of local regions 105 of the reference image 104 and in each of the corresponding local regions 107 of the plurality of corresponding local regions 107 of the subsequent image 106.

Additionally, the image alignment system 100 extracts (i.e., generates) feature descriptors 110 for each detected feature point 108 of the reference image 104 and the subsequent image 106. For example, the image alignment system 100 generates a descriptor vector for each detected feature point 108. Each descriptor vector includes information (e.g., intensity information, pixel location information, local neighborhood information) regarding its respective feature point 108. For example, each feature descriptor 110 may include a numerical "fingerprint" that can be utilized to differentiate one feature point 108 from another. Detecting the feature points 108 and extracting feature descriptors 110 will be discussed in greater detail below in regard to FIGS. 2 and 3.

In response to detecting feature points 108 in each of the reference image 104 and the subsequent image 106, the image alignment system 100 determines matching pairs 112 of feature points 108 between the reference image 104 and the subsequent image 106. In particular, the image alignment system 100 determines which feature points 108 detected in the reference image 104 correspond to which feature points 108 detected in the subsequent image 106. For example, for a given feature point 108 detected in the reference image 104, the image alignment system 100 alignment system determines a feature point detected in the subsequent image 106 that correlates to the given feature point of the reference image 104 (e.g., indicates a same feature point as the given feature point). In some embodiments, the image alignment system matches detected feature points 108 between the reference image 104 and the subsequent image 106 according to feature descriptor 110 similarities of the feature points 108. Matching the feature points 108 between the reference image 104 and the subsequent image 106 is described in greater detail below in relation to FIG. 4.

Upon determining the matching pairs 112 of feature points 108 between the reference image 104 and the subsequent image 106, the image alignment system 100 determines (e.g., estimates) at least one homography 114 (e.g., homography transform, motion estimation) of the reference image 104 to the subsequent image 106 based on the matching pairs 112 of feature points 108 between the reference image 104 and the subsequent image 106. As used herein, the term "homography" refers to a transformation that maps objects and/or lines from one plane to another plane. For example, the term "homography" refers to a transformation that maps feature points 108 from the reference image 104 (i.e., the defined plane of the reference image 104) to the subsequent image 106 (i.e., the defined plane of the subsequent image 106).

In one or more embodiments, the image alignment system 100 determines the homography 114 by applying (i.e., fitting) a homography motion model to at least a portion of the reference image 104 and subsequent image 106 using traditional optimization methods. In some instances, the image alignment system 100 can apply a homography motion model to each of the local regions 105 of the reference image 104 and the corresponding local regions 107 individually to determine a plurality of homographies mapping different portions (i.e., local regions) of the reference image 104 to the subsequent image 106. Furthermore, as will be discussed in greater detail below, the image alignment system 100 can utilize a bottom-up hierarchical approach in applying a homography motion model to the local regions 105 and corresponding local regions 107 to determine the plurality of homographies. Determining the homography of the reference image 104 to the subsequent image 106 is described in greater detail below in regard to FIGS. 5-7.

In addition to determining the plurality of homographies of the reference image 104 to the subsequent image 106, the image alignment system 100 adjusts (e.g., refines) boundaries (e.g., corner points and borders) between transformed local regions (e.g., homographies determined for the local regions) of an initial new image (e.g., a warped image) generated based on the plurality of homographies. For example, after determining the plurality of homographies and transforming the corresponding local regions 107 of the subsequent image 106 to generate the initial new image, the image alignment system 100 can refine the corner points of the transformed local regions that correspond to contiguous corner points of the subsequent image 106. In particular, the image alignment system 100 can refine the transformed corner points by taking an average position (e.g., location) of the transformed corner points of the initial new image and resetting the contiguous corner points of the subsequent image 106 (i.e., the image to be transformed) to this average position and retransforming the subsequent image 106 based on the reset corner points. The foregoing procedure can be repeated for each set of contiguous corners of the subsequent image 106.

Furthermore, as noted above, the image alignment system 100 can refine the borders of the corresponding local regions of the subsequent image while generating the new aligned image. For example, when the image alignment system 100 transforms (i.e., warps) the subsequent image 106 based on the plurality of homographies to generate the new aligned image 116, the image alignment system 100 can refine the borders of local regions of the new aligned image 116 by interpolating homography flow vectors of the homographies that are proximate to borders 1002 shared by two or more of the corresponding local regions 107 of the subsequent image 106. In particular, for each pixel location of the subsequent image 106 within a predefined distance from a given shared border 1002 of a corresponding local region 107, the image alignment system 100 determines multiple motion vectors based on the determined homographies of the corresponding local regions 107 sharing the given border. Furthermore, the image alignment system 100 determines weights of each of the pixel locations within the predefined distance. In particular, for a given pixel location, its weight is inversely proportional to a distance of the given pixel location from a respective corresponding local region 107 center. Moreover, based on the determined multiple motion vectors and determined weight of the pixel location, the image alignment system 100 averages the motion vectors with the weight to determine a new homography flow vector of the pixel location. Adjusting the boundaries between transformed local regions of the new aligned image 116 is described in greater detail below in regard to FIGS. 8A-10.

Upon determining adjustments to the boundaries, the image alignment system 100 warps the subsequent image 106 according to the determined plurality of homographies and the determined adjustments to generate the new aligned image 116 (i.e., a final new image). The new aligned image can be pixel-wise aligned to the reference image 104. As used herein, the term "pixel-wise" can refer to the new aligned image 116 being aligned to the reference image 104 according to the pixels of the reference image 104. For example, when aligned pixel-wise to the reference image 104, the pixels of the new aligned image 116 are aligned to match the alignment of the pixels of the reference image 104. Furthermore, because the image alignment system 100 warps the subsequent image 106 based on a plurality of homographies and the determined adjustments, the image alignment system 100 can generate a new aligned image 116 having less blur and a higher quality than images generated by conventional systems.

FIG. 2 illustrates an example reference image 104 and an example subsequent image 106 of the plurality of burst images of which the image alignment system 100 of the present disclosure can detect feature points 108 and can extract feature descriptors 110 in accordance with one or more embodiments. As shown in FIG. 2, each of the reference image 104 and the subsequent image 106 are subdivided into four local regions 105 and four corresponding local regions 107, respectively, by a 2×2 spatial grid. Furthermore, as noted above, the image alignment system 100 can detect a plurality of feature points 108a, 108b in each of the local regions 105 of the reference image 104 and in each of the corresponding location regions 107 of the subsequent image 106.

In some embodiments, the image alignment system 100 utilizes a feature point detector and descriptor to detect feature points 108 and to determine feature descriptors 110 of the detected feature points 108. In particular, the feature point detector can analyze an image (e.g., the reference image 104) and can output locations (i.e., pixel locations) of significant areas (i.e., interest points) of the image. For example, the feature point detector can output the locations of corners, edges, ridges, textures, and blobs of objects and/or elements depicted in the image. Additionally, the descriptor can analyze the detected feature points 108 and can output (e.g., generate) a descriptor vector for each detected feature point that encodes information (e.g., intensity information, pixel location information, local neighborhood information) regarding its respective feature point. For example, each descriptor can include a binary descriptor vector. In some embodiments, each descriptor can include a dimension of 256 for 32-byte binary feature points 108.

In one or more embodiments, the image alignment system 100 can utilize an Oriented FAST and Rotated BRIEF ("ORB") key point detector and descriptor to detect the feature points 108 and determine feature descriptors 110. In particular, the image alignment system 100 can utilize the ORB key point detector and descriptor described in Rublee, Ethan, et al., *ORB: An Efficient alternative to SIFT or SURF*, International Conference on Computer Vision, pp. 2564-2571 (2011), the disclosure of which is incorporated in its entirety by reference herein. In additional embodiments, the image alignment system 100 can utilize other key point detectors and descriptors such as, for example, a Scale Invariant Feature Transform (SIFT) key point detector and descriptor, a Speeded-Up Robust Features (SURF) key point detector and descriptor, and/or a Histogram of Oriented Gradients (HOG) key point detector and descriptor.

As noted above, in some instances, the image alignment system 100 can detect the feature points 108 within each local region 105 of the reference image 104 and the feature points 108 within each corresponding local region 107 of the subsequent image 106. Additionally, the image alignment system 100 can select a top predetermined number of feature points 108 having a highest response (i.e., a highest confidence) from each of the local regions 105 and from each of the corresponding local regions 107 to include as (e.g., designated as) detected feature points 108. Accordingly, by selecting a predetermined number of feature points 108 from each local region 105 and corresponding local region 107, the detected feature points 108 are evenly distributed among the local regions 105 of the reference image 104 and evenly distributed among the corresponding local regions 107 of the subsequent image 106. Example predetermined numbers of feature points 108 include 50, 100, 200, 300, or any other number of feature points 108. For instance, the predetermined number of feature points 108 can be dependent on a size, quality, and/or resolution of an image. If the image alignment system 100 does not detect at least the predetermined number (i.e., a threshold number) of feature points 108 within a specific local region 105 (or corresponding local region 107), the image alignment system 100 selects all of the feature points 108 detected in that specific local region 105.

As a non-limiting example, such as the example depicted in FIG. 2, each of the four local regions 105 of the reference image 104 can include 100 detected feature points 108 such that the reference image 104 overall includes 400 detected feature points 108. Accordingly, the image alignment system 100 can insure that feature points 108 are detected in each of the local regions 105 (and corresponding local regions 107) instead of just feature point rich local regions. As a result, the image alignment system 100 can insure that objects and/or elements depicted by an image (e.g., the reference image 104) are better represented by the detected feature points 108 than by conventional systems, which utilize global feature detection instead of detecting feature points within each local region 105 individually.

Figure 3:
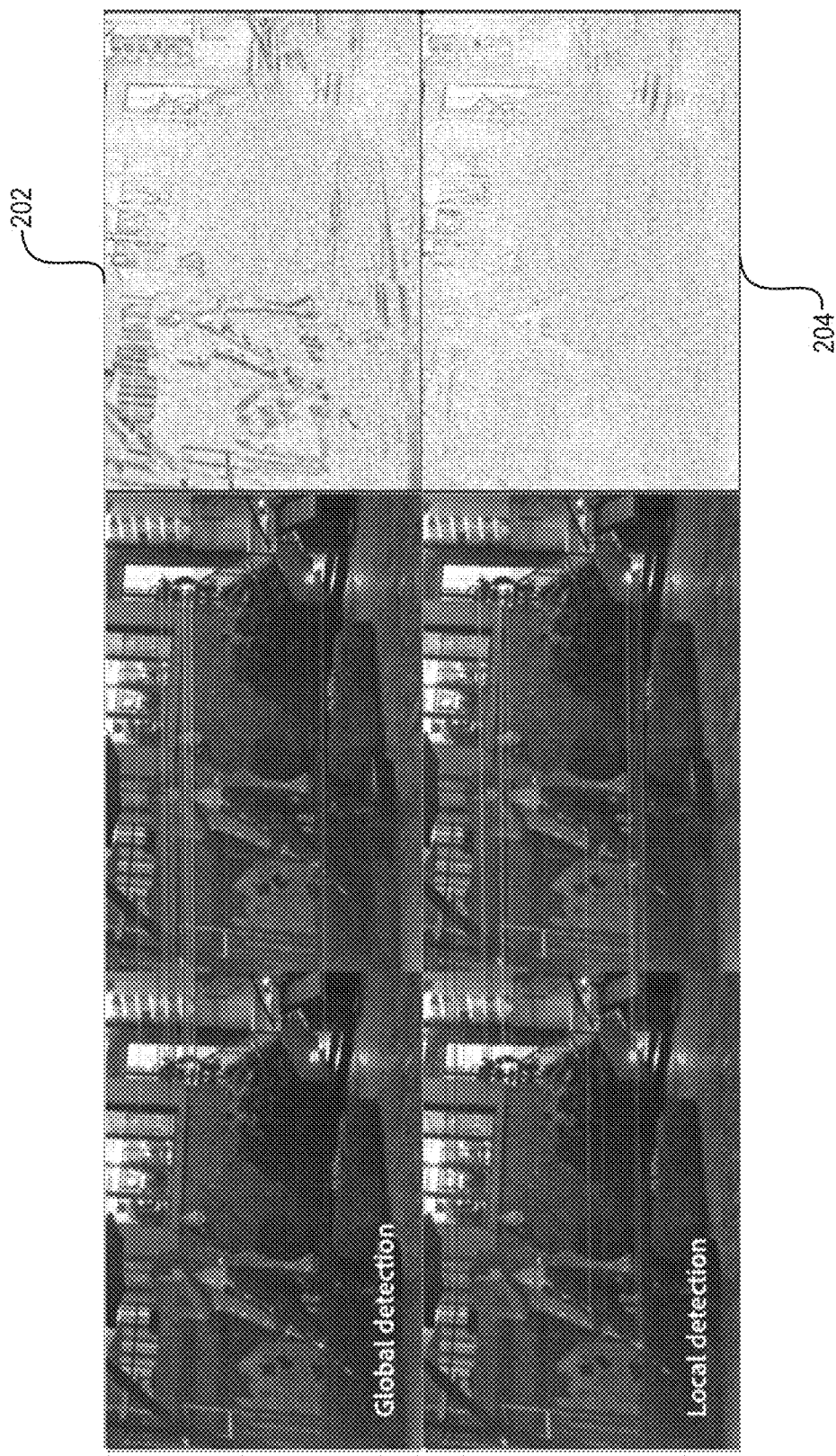
FIG. 3 illustrates a comparison of feature points detected with a global detection system and feature points detected with a local region detection system in accordance with one or more embodiments.

For example, FIG. 3 illustrates a comparison of feature points 108 (e.g., objects) detected (and selected) by a global detection system and by a local detection system (i.e., the image alignment system 100 of the present disclosure). Residual feature points 108 undetected (i.e., feature points 108 not detected and/or selected) by the two systems are depicted in boxes 202 and 204 in gray and/or black. As illustrated, the global detection system detected significantly fewer feature points 108 than the local detection system described herein. In other words, the local detection system (i.e., the image alignment system 100) detected significantly more feature points 108 than the global detection system.

Figure 4:
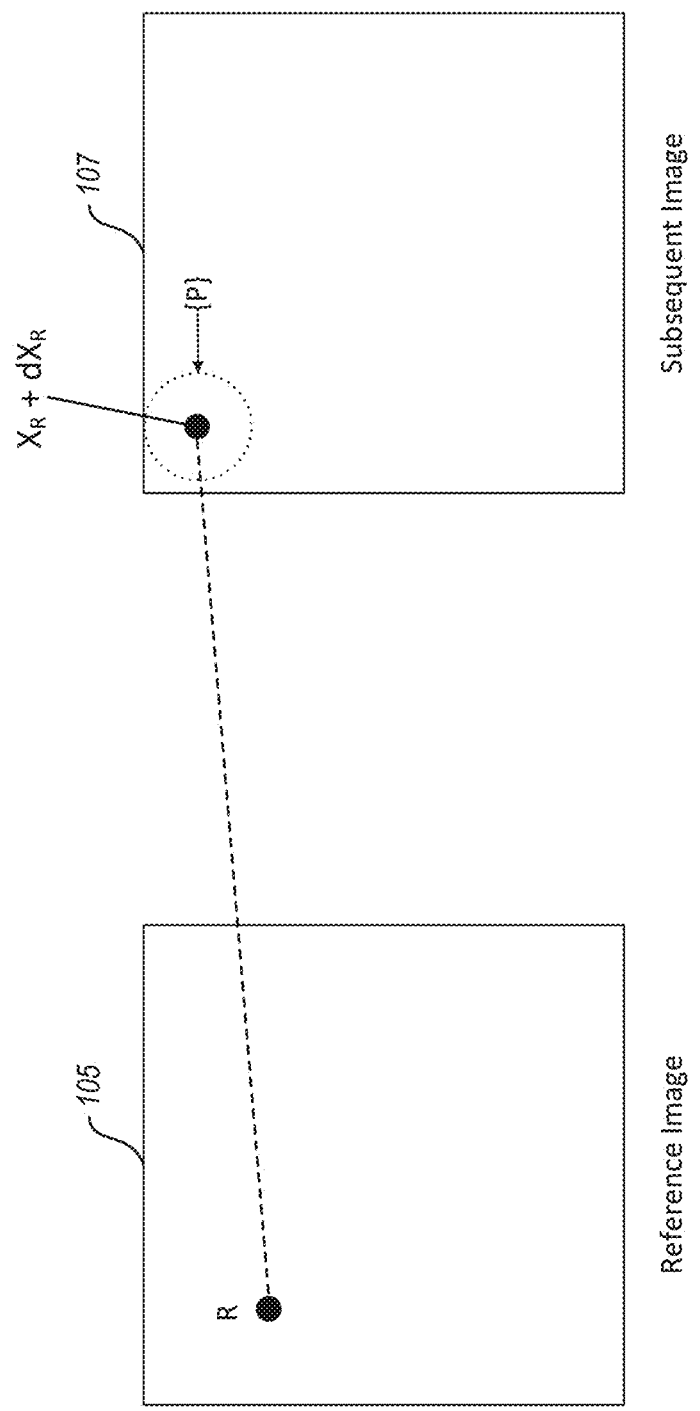
FIG. 4 illustrates a schematic representation of matching feature points between a reference image and a subsequent image in accordance with one or more embodiments.

As mentioned briefly above, matching the feature points 108 between the reference image 104 and the subsequent image 106 is described in greater detail in regard to FIG. 4. In particular, FIG. 4 illustrates a local region 105 of the reference image 104 and a corresponding local region 107 of the subsequent image 106. In order to match the feature points 108 between the reference image 104 and the subsequent image 106, the image alignment system 100 selects a detected feature point R in the reference image 104 and matches the feature point R to the most similar point in the subsequent image 106. In some embodiments, the image alignment system 100 determines the similarity of two given feature points 108 by evaluating the Hamming distance between the descriptors 110 of the feature points 108. As is known in the art, the Hamming distance between two vectors (e.g., the descriptors 110) is then number of corresponding positions (e.g., values) of the two vectors that are different. For instance, the Hamming distance measures a minimum number of substitutions that would be require to change a first vector of two vectors to a second vector of the two vectors. As will be appreciated by one of ordinary skill in the art, the Hamming distance measures a minimum number of errors that could have transformed the first vector into the second vector.

In one or more embodiments, for a given feature point in the reference image 104 (e.g., feature point R), the image alignment system 100 determines (i.e., predicts) a corresponding position in the subsequent image 106. Furthermore, the image alignment system 100 only searches a respective corresponding local region 107 of the subsequent image 106 for a feature point P matching the given feature point R of the local region 105 the reference image 104, as illustrated in FIG. 4. For example, for a given feature point R having pixel location $X_R$, the image alignment system 100 predicts the matching feature point's pixel location as $X_R+dX_R$. In some embodiments, $dX_R$ is a prior motion offset estimated from a motion sensor (e.g., a motion sensor of the image capturing device 102). In additional embodiments, $dX_R$ is a prior motion offset estimated from previous alignment results (e.g., previously generated new images) using an autoregressive model. For example, the prior motion offset is regressed on previous prior motion offsets determined from analysis performed on additional subsequent images and the reference image 104.

Based on the predicted matching feature point's pixel location ($X_R+dX_R$), the image alignment system 100 compares the feature descriptor 110 of feature point R with the feature descriptor 110 of any feature point P having a pixel location $X_P$ that is proximate to $X_R+dX_R$. For example, the image alignment system 100 can compare the feature descriptor 110 of feature point R with the feature descriptor 110 of any candidate feature points {P} (i.e., any feature point of a set of potentially matching feature points 108) having a pixel location that is within a predetermined number of pixels (e.g., 50 pixels, 75 pixels, 100 pixels, 200 pixels, etc.) of $X_R$ $dX_R$. For instance, the image alignment system 100 can compare the feature descriptor 110 of feature point R with the feature descriptor 110 of any candidate feature points {P} within a circle extending around $X_R+dX_R$ with $X_R+dX_R$ being the center of the circle and the circle having a radius of the predetermined number pixels.

In addition to comparing the feature descriptor 110 of feature point R with the feature descriptor 110 of any candidate feature points {P}, the image alignment system 100 ranks (e.g., sorts and/or prioritizes) the candidate feature points {P} according to the similarities of feature descriptors 110 of candidate feature points {P} with the feature descriptor 110 of feature point R. As briefly mentioned above, in some embodiments, the image alignment system 100 determines the similarity of two given feature points 108 by evaluating the Hamming distance between the feature descriptors 110 of the feature points 108.

Upon ranking the candidate feature points {P} according to their similarities with feature point R, the image alignment system 100 filters all but a predetermined top number (i.e., a predetermined number) of candidate feature points {P} from consideration as a matching feature point. For example, the image alignment system 100 can filter all but a top 3, 6, or 10 candidate feature points {P} that are most similar to the feature point R. In other words, the image alignment system 100 keeps the top candidate feature points {P} under consideration as being a match to feature point R. For example, the image alignment system 100 keeps a set of potentially matching feature points 108 under consideration as being a match to feature point R. The image alignment system 100 keeps more than the top candidate feature point P because the top match could still be a false match and will be filtered (e.g., removed) from consideration as a candidate feature point in later processes. Furthermore, keeping more than the top match for each given feature point R of the reference image 104, results in more feature points 108 of the reference image 104 being correctly matched to candidate feature points {P} of the subsequent image 106. For instance, the image alignment system 100 determines more matched pairs of feature points 108 when more than one top candidate feature point P is preserved.

In response to determining the top candidate feature points {P} for feature point R, the image alignment system 100 filters (from the set of potentially matching feature points 108) any candidate feature points {P} having a descriptor distance above a threshold distance from the feature point R. In some embodiments, the descriptor distance is the Hamming distance between the feature descriptor 110 of the feature point R and a feature descriptor of a given candidate feature point P. In additional embodiments, the descriptor distance is a Euclidean distance feature descriptor 110 of the feature point R and a given candidate feature point P. In some instances, upon determining the descriptor distances between the feature point R and the candidate feature points {P}, the image alignment system 100 filters (e.g., removes) from consideration any candidate feature points {P} (of the set of potentially matching feature points 108) having a descriptor distance from the feature point R above, for example, 50, 80, 100, 150, or 200.

In addition to filtering candidate feature points {P} based on descriptor distances, the image alignment system filters candidate feature points {P} from consideration based on a displacement (i.e., $X_P-X_R$) of the potentially matching pair 112 of feature points 108. Specifically, from all the remaining candidate feature points {P} (of the set of potentially matching feature points 108), for all the detected feature points 108 {R} detected in the reference image 104 (e.g., from all potentially matching pairs 112 of feature points between the reference image 104 and the subsequent image 106), the image alignment system 100 determines a median displacement vector D as a median value of feature displacement $\{X_P-X_R\}$. As will be appreciated by one of ordinary skill in the art, the median displacement vector D is a robust approximation of a global translation between the reference image 104 and the subsequent image 106. Upon determining the median displacement vector D, the image alignment system 100 filters any candidate feature points $\{P\}$ corresponding to potentially matching pairs 112 having displacements $(X_P-X_R)$ that deviate from the median displacement vector D by more than a predetermined number of pixels. For example, the image alignment system 100 can filter any candidate feature points $\{P\}$ corresponding to potentially matching pairs 112 having displacements $(X_P-X_R)$ that deviate from the median displacement vector D by more 10, 20, 30, 40, 50, or 100 pixels.

In some instances, after filtering the candidate feature points $\{P\}$ based on predicted pixel location, descriptor distances, and relative displacements, multiple potentially matching pairs 112 of feature points 108 can remain for a same feature point R. In such instances, the image alignment system 100 selects a candidate feature point P having the highest similarity with the feature point R. The resultant pair (R, P) is the final matched feature point pair 112, which, as will be discussed in greater detail below, the image alignment system 100 utilizes to determine a motion estimate (i.e., a homography) of the reference image 104 to the subsequent image 106. Furthermore, the image alignment system 100 can perform the above-described procedures for each detected feature point 108 of the reference image 104 to determine a plurality of matching pairs 112 of feature points 108 between the reference image 104 and the subsequent image 106.

As mentioned above briefly, determining the homography of the reference image 104 to the subsequent image 106 is described in greater detail below in regard to FIGS. 5 and 6. Furthermore, in one or more embodiments, the actions illustrated and described in relation to FIGS. 5 and 6 may be performed within a step for determining a homography for each local region 105 of the plurality of local regions 105. As noted above, when determining the homography of the reference image 104 to the subsequent image 106, the image alignment system 100 applies a homography motion model to each of the local regions 105 of the reference image 104. Specifically, the image alignment system 100 can apply a conventional homography motion model to each local region 105 while using traditional optimization methods. For example, the image alignment system 100 can apply the homography motion model and traditional optimization methods described in Liu, Ziwei et al., *Fast Burst Images Denoising*, ACM Transaction on Graphics 33, No 6: 232 (2014), the disclosure of which is incorporated in its entirety by reference herein.

Furthermore, the operation of the image alignment system 100 applying a conventional homography motion model to each local region 105 of the plurality of local regions 105 can be described in relation to algorithms, equations, or pseudocode performed by a computing device (e.g., a server). More particularly, applying a conventional homography motion model to each local region 105 can involve the following algorithms and equations.

In order to estimate a homography H, the image alignment system 100 begins with the following:

$$x_2 \sim Hx_1$$

which represents a direct mapping between points in two image planes. Furthermore, when utilizing homogenous coordinates, the image alignment system 100 utilizes the following constraint:

$$\begin{bmatrix} x_2 \\ y_2 \\ z_2 \end{bmatrix} = \begin{bmatrix} H_{11} & H_{12} & H_{13} \\ H_{21} & H_{22} & H_{23} \\ H_{31} & H_{32} & H_{33} \end{bmatrix} \begin{bmatrix} x_1 \\ y_1 \\ z_1 \end{bmatrix} \Leftrightarrow x_2 = Hx_1$$

When utilizing inhomogeneous coordinates, such as, $(x_2'=x_2/z_2$ and $y_2'=y_2/z_2)$, the image alignment system 100 utilizes the following constraints:

$$x_2' = \frac{H_{11}x_1 + H_{12}y_1 + H_{13}z_1}{H_{31}x_1 + H_{32}y_1 + H_{33}z_1}$$

$$y_2' = \frac{H_{21}x_1 + H_{22}y_1 + H_{23}z_1}{H_{31}x_1 + H_{32}y_1 + H_{33}z_1}$$

Additionally, without loss of generality, the image alignment system 100 defines $z_1=1$, and rearranges the previous equation as:

$$x_2'(H_{31}x_1+H_{32}y_1+H_{33})=H_{11}x_1+H_{12}y_1+H_{13}$$

$$y_2'(H_{31}x_1+H_{32}y_1+H_{33})=H_{21}x_1+H_{122}y_1+H_{23}$$

Even though the above inhomogeneous equations involve the coordinates nonlinearly, the coefficients of H appear linearly. Accordingly, in order to solve for H, the image alignment system 100 rearranges the previous two equations as:

$$a_x^T h = 0$$

$$a_y^T h = 0$$

where $$h=(H_{11},H_{12},H_{13},H_{21},H_{22},H_{23},H_{31},H_{32},H_{33})^T$$

$$a_x=(-x_1,-y_1,-1,0,0,0,x_2'x_1,x_2'y_1,x_2')^T$$

$$a_y=(0,0,0,-x_1,-y_1,-1,y_2'x_1,y_2'y_1,y_2')^T$$

Furthermore, based on the determined matching feature points 108 (i.e., correspondences) described above in regard to FIG. 4, the image alignment system 100 can form the following linear system of equations:

$$Ah = 0$$

where $$A = \begin{pmatrix} a_{x1}^T \\ a_{y1}^T \\ \vdots \\ a_{xN}^T \\ a_{yN}^T \end{pmatrix}$$

The image alignment system 100 can solve the above equations utilizing homogenous linear least squares, which is known in the art. Accordingly, the image alignment system 100 can, in some embodiments, utilize the above equations to determine the homographies of the local regions 105.

Figure 5:
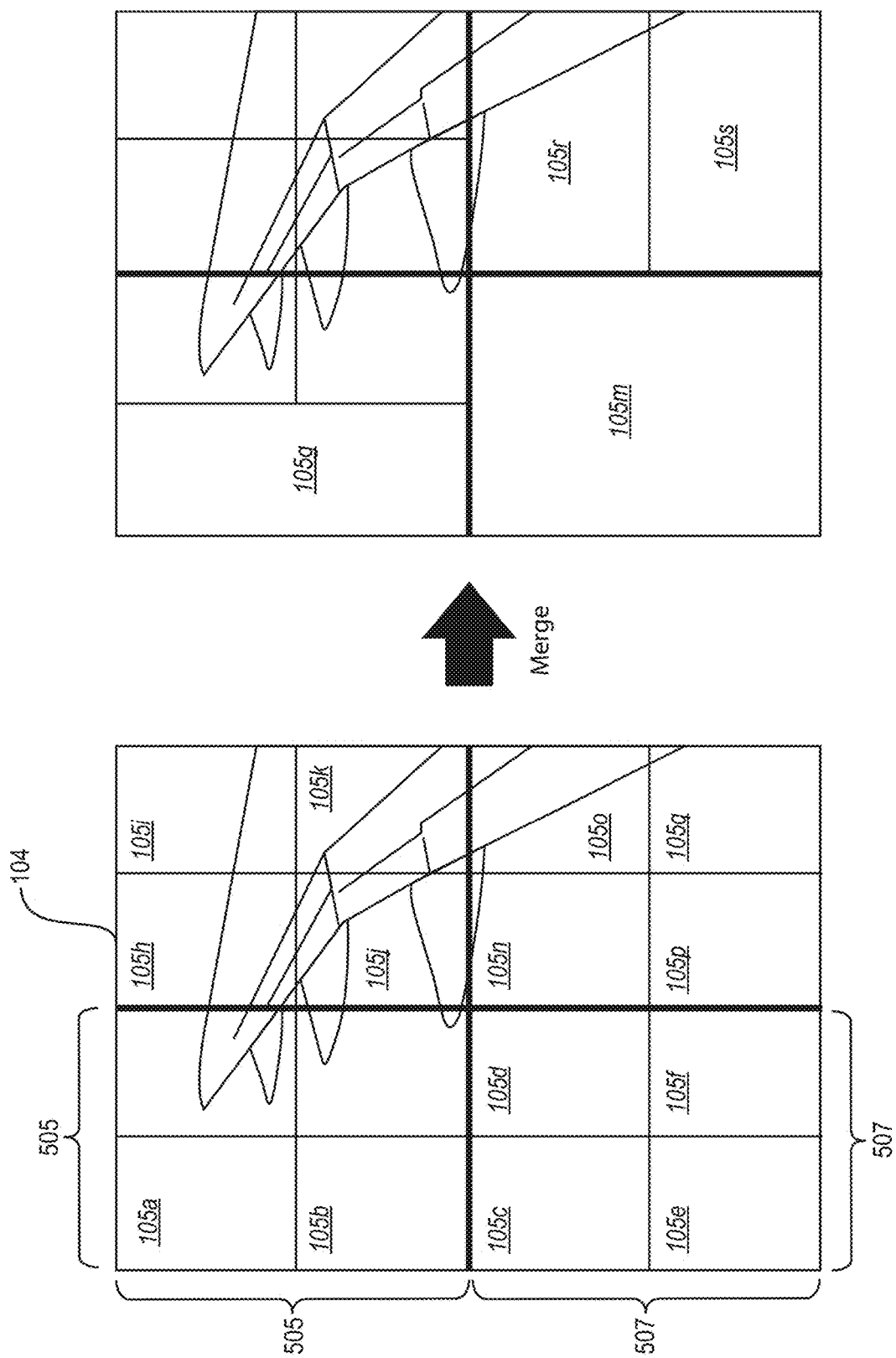
FIG. 5 illustrates a schematic representation of merging local regions of an image according to one or more embodiments of the present disclosure.

Referring still to FIG. 5, in some embodiments, prior to applying the homography motion model described above, the image alignment system 100 can determine whether a given local region 105 of the reference image 104 includes a threshold (i.e., a predetermined) number of detected feature points 108. The threshold number can include 50, 75, 100, 200, 500, 1000, or any other number of detected feature points 108. For example, the threshold number of detected feature points 108 can be dependent on a size, quality, and/or resolution of an image.

Furthermore, depending on whether a given local region 105 includes the threshold number of detected feature points 108, the image alignment system 100 can apply a bottom-up hierarchical estimation of homography flow. For example, if the image alignment system 100 determines that a given local region 105 includes the threshold number of detected feature points 108, the image alignment system 100 applies the homography motion model to the given local region 105 as described above. If, on the other hand, the image alignment system 100 determines that a given local region 105 does not include the threshold number of detected feature points 108, the image alignment system 100 merges the given local region 105 with another local region of the same level of hierarchy and within a local region (i.e., a larger local region) of a next level of hierarchy and applies the homography motion model to the merged local region. For example, FIG. 5 illustrates the reference image 104 as initially being subdivided into a plurality of local regions, and local region 105a and local region 105b are proximate to each other (i.e., sharing a border) and, in some embodiments, may not include a significant number of feature points 108. Accordingly, upon determining that one or more of local regions 105a and 105b does not include the threshold (i.e., the predetermined) number of feature points 108, the image alignment system 100 can merge local region 105a and local region 105b to form local region 105g. However, as illustrated, the image alignment system 100 merges the local region 105a and local region 105b within the local region 505 (e.g., the next level of hierarchy).

In some embodiments, the levels of hierarchy are defined by local sets of quadrants of the local regions. For example, as shown in FIG. 5, local regions 105c, 105d, 105e, and 105f are within the same set of quadrants (2×2 set of quadrants), and therefore, are within the same level of hierarchy. The next level of hierarchy (i.e., the level of hierarchy above the local regions 105c, 105d, 105e, and 105f) is the local region (and associated local regions) that is subdivided into the set of quadrants defining local regions 105c, 105d, 105e, and 105f, e.g., local region 507. Furthermore, should the image alignment system 100 determine that one or more of the local regions 105c, 105d, 105e, and 105f does not include the threshold number of detected feature points 108, the image alignment system 100 merges the lacking local region with another of the local regions within the same set of quadrants. For instance, the image alignment system 100 merges the lacking local region with another local region of the same level of hierarchy and that shares the same next level of hierarchy (e.g., another local region that is within the local region 507). For example, the image alignment system 100 would not merge the lacking local region with local region 105c because, even though local region 105c is of the same level of hierarchy, the local region 105c does not share the same next level of hierarchy. Moreover, if, after merging all the local regions 105c, 105d, 105e, and 105f together, the image alignment system 100 determines that the merged local region (now local region 507) does not include the threshold number of feature points 108, the image alignment system merges local region 507 with another local region (e.g., local region 505) of the same level of hierarchy and that shares the same next level of hierarchy (e.g., the entire image in this case).

In one or more embodiments, upon determining that a given local region does not include the threshold number of feature points 108, the image alignment system 100 can merge the local region with other local regions until the resulting merged local region includes the threshold number of feature points 108. In some embodiments, the image alignment system 100 can merge the local regions for up to three levels of hierarchy, e.g., from one sixteenth of the image to a quadrant of the image to the entire image. Additionally, in one or more embodiments, the image alignment system 100 can merge the local region lacking the threshold number of feature points 108 with another local region of the same level of hierarchy having the fewest number of detected feature points 108. In particular, the image alignment system 100 can merge the local region lacking the threshold number of feature points 108 with other local regions of the same level of hierarchy in order of the number of detected feature points in each of the other local regions, starting with the local region having the fewest number of feature points 108 detected. The levels of hierarchy are described in additional detail below in regard to FIG. 6.

Figure 6:
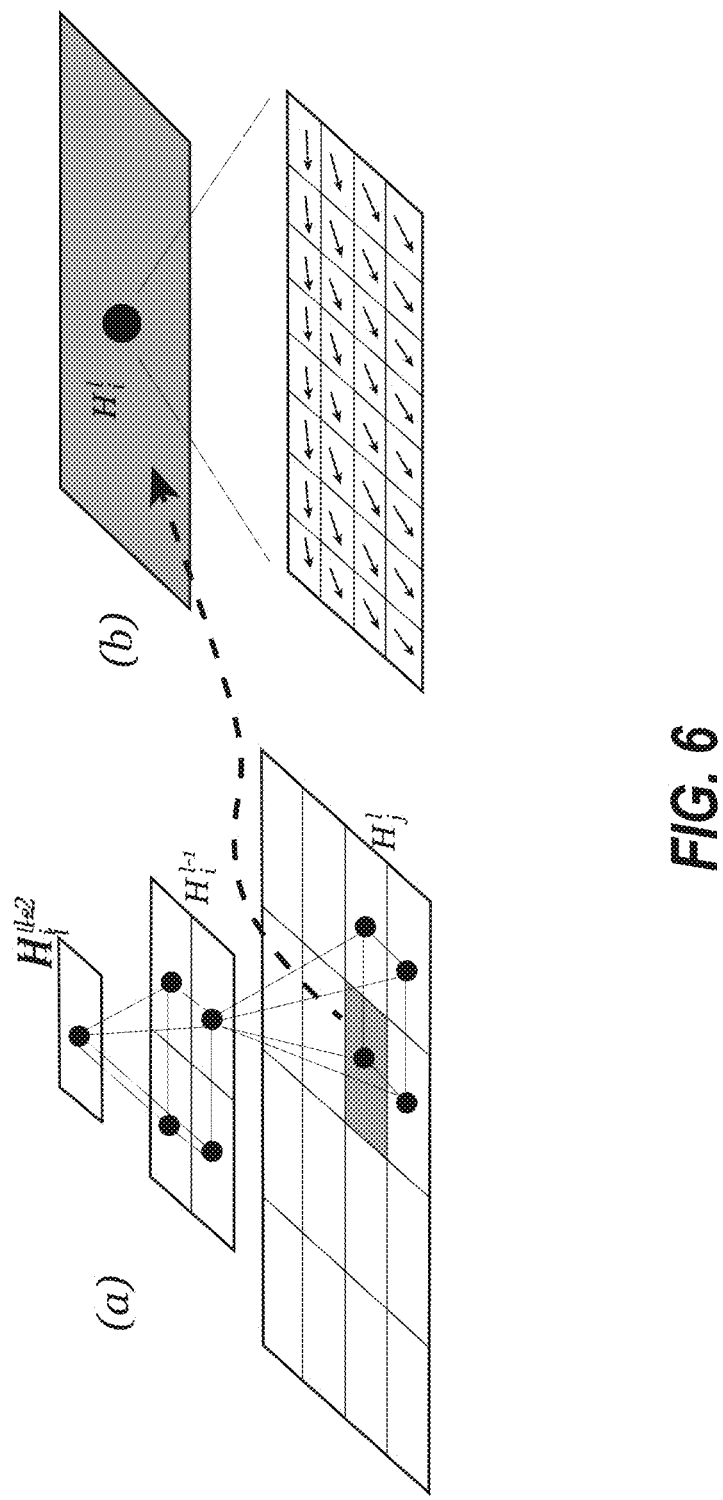
FIG. 6 shows a schematic representation of different levels of a hierarchy of local regions within an image and associated homographies according to one or more embodiments of the present disclosure.

Specifically, FIG. 6 illustrates another representation of the levels of hierarchy in accordance with one or more embodiments. As shown, the image alignment system 100 can subdivide a reference image 104 into four quadrants and can subdivide each quadrant into four quadrants, which results in the reference image 104 being subdivided into sixteen local regions. Furthermore, by having sixteen local regions, the reference image 104 includes at least three levels of hierarchy. The lowest level (i.e., bottom level) (l) is the level at each individual local region of the sixteen local regions and represents a first level of hierarchy. Additionally, at the lowest level (l), the image alignment system 100 considers each of the sixteen local regions individually. Furthermore, as illustrated, at the lowest level (l), a homography of local region (i) at the lowest level (l) can be defined as $H_i^l$. Moreover, as shown, the homography $H_i^l$ can represent the homography flows of local region (i) at the lowest level (l).

The first level up (l–1) from the lowest level (l) is the level at the four quadrants of the overall image and represents a second level of hierarchy. A homography of a local region (i.e., quadrant) at the first level up (l–1) can be defined as $H_i^{l-1}$. Furthermore, as discussed above, if the image alignment system 100 merges one of the local regions at the first level of hierarchy with a neighboring local region (e.g., a local region sharing a border) at the first level of hierarchy, the image alignment system 100 merges the local region with the neighboring local region within its respective quadrant at the second level of hierarchy.

The second level up (l–2) from the lowest level (l) is the level that includes the entire reference image 104 and represents a third level of hierarchy. A homography of the entire reference image 104 at the second level up (l–2) can be defined as $H_i^{l-2}$. Furthermore, as discussed above, if the image alignment system 100 merges one of the local regions at the second level of hierarchy with a neighboring local region (e.g., a local region sharing a border) at the second level of hierarchy, the image alignment system 100 merges the local region with the neighboring local region within its respective third level of hierarchy (e.g., the entire image in the illustrated embodiment).

Although only three levels of hierarchy are described in regard FIG. 6, one of ordinary skill the in art will readily recognize, that any number of levels of hierarchy could be utilized by the image alignment system 100 of the present disclosure depending on the size and quality of the reference image 104. For example, the image alignment system 100 could utilize four, five, ten, or twenty levels of hierarchy.

Referring to FIGS. 5 and 6 together, in view of the foregoing, the image alignment system 100 can individualize how the image alignment system 100 applies a homography motion model to each area of the reference image 104. Specifically, as shown in the embodiment illustrated in FIG. 5, the image alignment system 100 can merge local regions 105c, 105d, 105e, and 105f together up to the quadrant level of hierarchy (i.e., the second level of hierarchy) to form local region 105m in order to include the threshold number of feature points 108. Additionally, the image alignment system 100 can merge local regions 105a and 105b together to form local region 105g, which is a side half of a quadrant of the reference image 104. Furthermore, as illustrated, the image alignment system 100 can merge local regions 105n and 105o to form local region 105r, which is a top half of a quadrant of the reference image 104. Likewise, the image alignment system 100 can merge local regions 105p and 105q to form local region 105s, which is a bottom half of a quadrant of the reference image 104. Moreover, as shown, the image alignment system 100 may not merge local regions 105h, 105i, 105j, and 105k because the local regions 105h, 105i, 105j, and 105k include the threshold number of feature points 108 without merging. In some embodiments, the image alignment system 100 can apply a more robust (e.g., more powerful) motion model to merged local regions that include significantly more than the threshold number of detected feature points 108. Accordingly, the image alignment system 100 can customize how homography motion models are applied to the reference image 104 based on where the feature points 108 (e.g., concentrations of feature points 108) are located within the reference image 104. As a result, in comparison to convention image systems, which utilize known joint optimization methods, the image alignment system 100 is computationally more efficient and results in warped images (i.e., the new aligned image 116) having less residual alignment error.

For example, FIG. 7 illustrates a comparison of residual alignment error produced by a utilizing a global (i.e., single) homography and by utilizing local homographies that are merged according to the levels of hierarchy described above in regard to FIGS. 5 and 6. Residual alignment error (i.e., errors in aligning/warping images) produced by the conventional systems and the image alignment system 100 are depicted in boxes 702 and 704, respectively, in gray and/or black. As illustrated, conventional images systems produced significantly more alignment errors that the image alignment system 100 of the present disclosure.

Although the processes described above in regard to FIGS. 5-7 are described in relation to the reference image 104, it will be readily recognize that the same processes can be performed in regard to the subsequent image 106. Moreover, in one or more embodiments, the actions illustrated and described in relation to FIGS. 5-7 may be performed as the step for determining a homography for each local region 105 of the plurality of local regions 105.

Figure 8B:
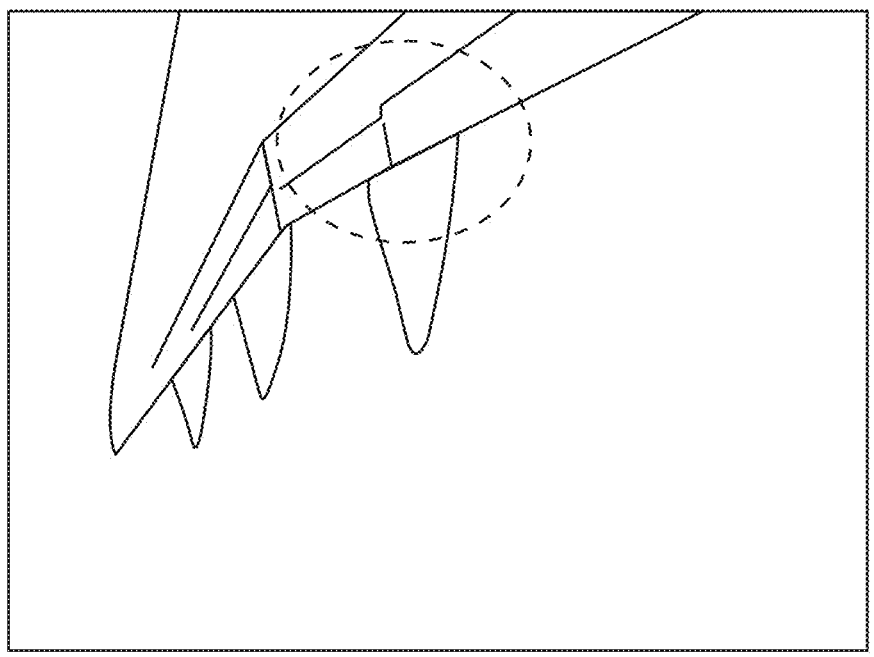
FIGS. 8A and 8B illustrate a schematic representation of refining boundaries of local regions within an image in order to decrease deformation when warping images in accordance with one or more embodiments of the present disclosure.
Figure 8A:
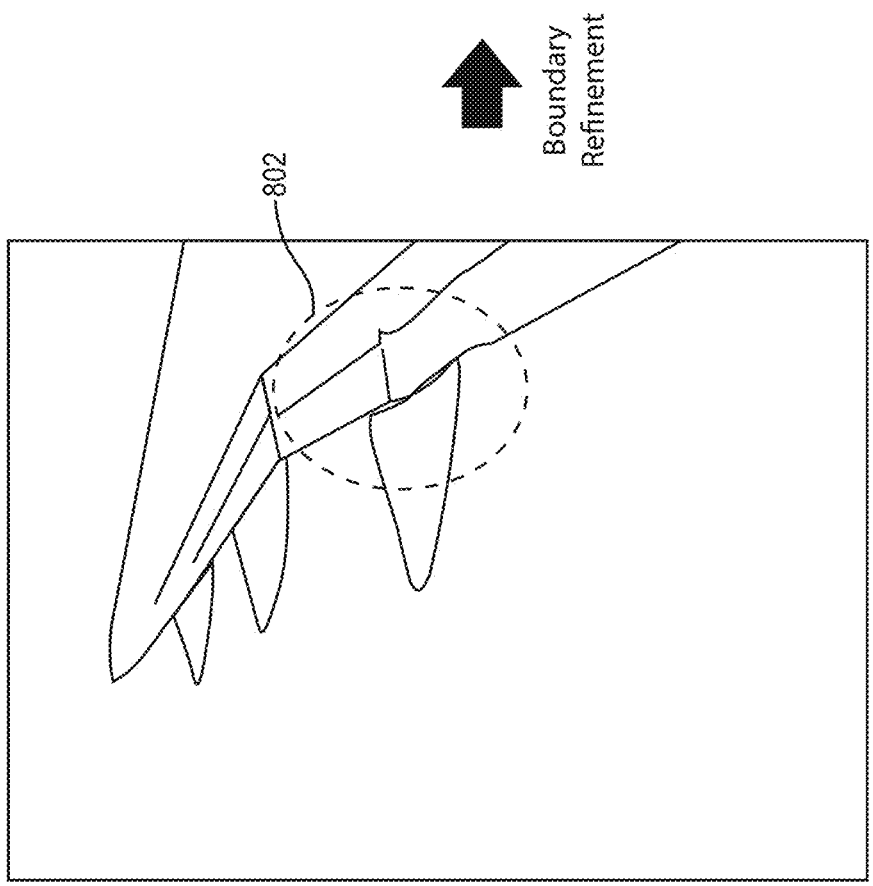

As discussed briefly above, adjusting the boundaries between transformed local regions of the warped image is described in greater detail in regard to FIGS. 8A-10. For example, FIG. 8A illustrates image deformation 802 within a new aligned image (i.e., the new aligned image 116) that can be caused by inconsistent location motion warping (e.g., when neighboring homographies have different (e.g., significantly different) homography flows). FIG. 8B illustrates the new aligned image after the image alignment system 100 adjusts the boundaries between transformed local regions. In one or more embodiments, because the homographies of the local regions are determined independently, as discussed above in regard to FIGS. 5-7, the homographies (i.e., the estimated motion) can be inconsistent around boundaries of the local regions. As a result, an image (i.e., the new aligned image 116) generated from the homographies can be inconsistent at the boundaries of the local regions. In some embodiments, the image alignment system 100 reduces and/or eliminates inconsistencies in the warped image by refining corner points of the transformed local regions. In additional embodiments, the image alignment system 100 reduces and/or eliminates inconsistencies in the warped image by refining the shared borders of the transformed local regions. Each of the foregoing is described in greater detail below.

Figure 9:
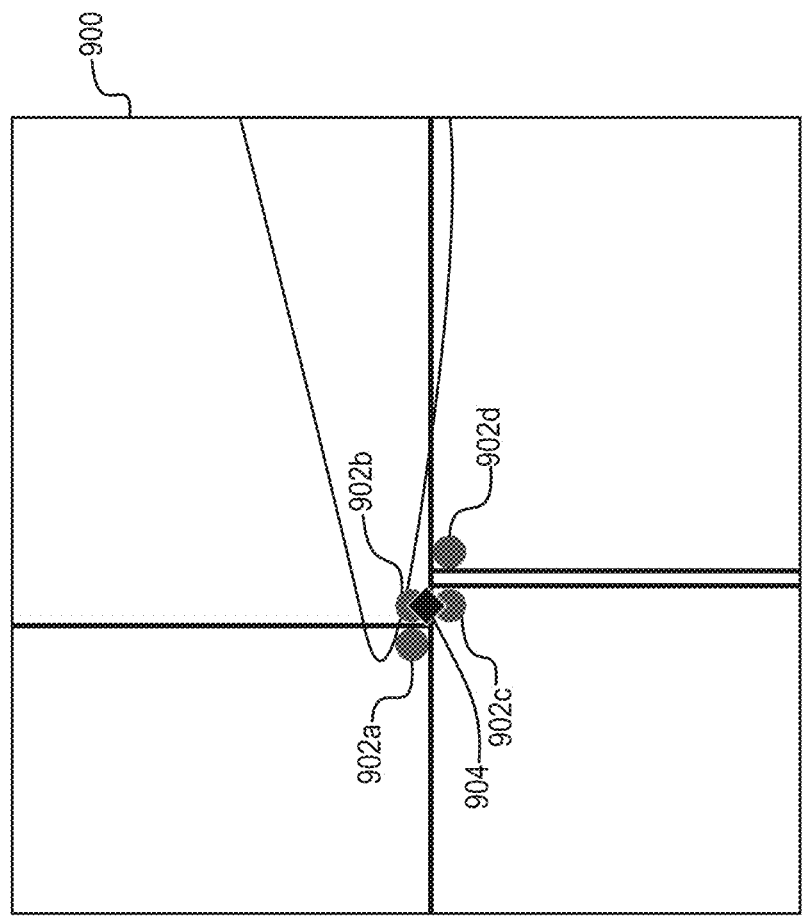
FIG. 9 illustrates a schematic representation of noncontiguous corner points of a warped image and average coordinates of the noncontiguous corner points according to one or more embodiments of the present disclosure.

As noted above, in order to reduce and/or eliminate inconsistencies in the warped image, the image alignment system 100 refines corner points of the transformed local regions. FIG. 9 illustrates an example embodiment of an initial warped image 900 having transformed corner points 902a, 902b, 902c, 902d (referred to herein collectively as "902") that do not align (e.g., are not contiguous) after transformation. In operation, upon initially transforming the corresponding local regions 107 of the subsequent image 106 according to the determined homographies, the image alignment system 100 determines whether the transformed corner points 902 of the transformed local regions that correspond to contiguous corner points of the corresponding local regions 107 of the subsequent image 106 are contiguous within the warped image. If the image alignment system 100 determines that the transformed corner points 902 are not contiguous, the image alignment system 100 determines the coordinates (e.g., pixel location) of each of the transformed corner points 902 within the initial warped image 900. Furthermore, based on the coordinates of each of the transformed corner points 902, the image alignment system 100 determines average coordinates 904 of the transformed corner points 902 within the initial warped image 900.

Upon determining the average coordinates 904 of the transformed corner points 902, the image alignment system 100 resets the coordinates of the contiguous corner points of the subsequent image 106 (i.e., the image that was transformed) to the average coordinates 904. The image alignment system 100 repeats the foregoing procedure described in regard to FIG. 9 for all of the corner points of corresponding local regions 107 of the subsequent image 106 that are contiguous with another corner point (e.g., corner points that are shared by two or more corresponding local regions 107). Furthermore, upon resetting the coordinates of all of the corner points of the subsequent image 106, the image alignment system 100 reapplies the homography motion model to (e.g., retransforms) each corresponding local region 107 of the subsequent image 106 based on the reset corner points to generate the new aligned image 116 (e.g., the new aligned image 116), which is pixel-wise aligned to the reference image 104.

Figure 10:
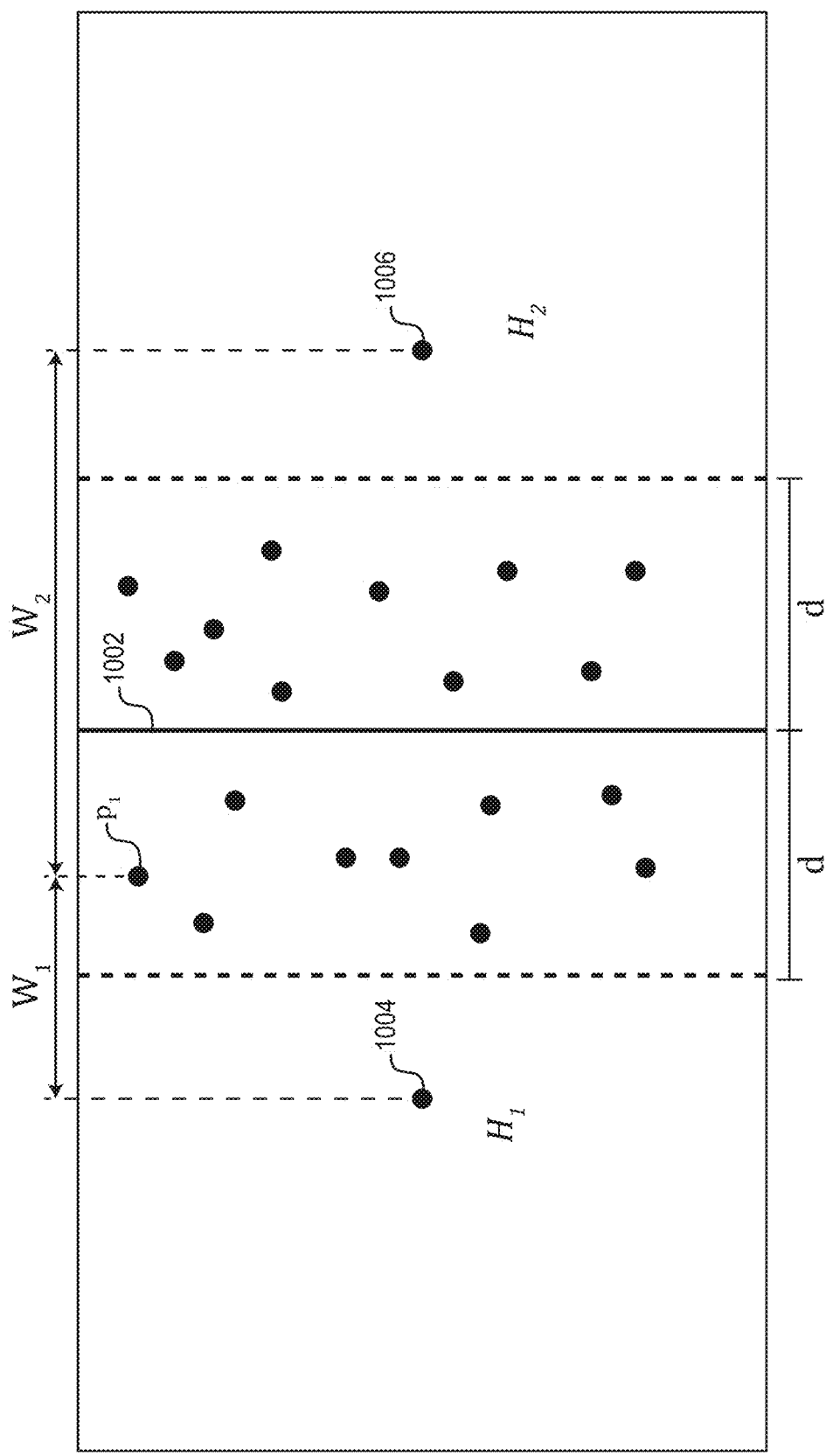
FIG. 10 illustrates a schematic representation of a shared border of local regions of an image according to one or more embodiments of the present disclosure.

FIG. 10 illustrates a partial subsequent image 106 having two corresponding local regions 107 with each of the two local regions having a determine homography ($H_1$ and $H_2$).

As mentioned above, in order to reduce and/or eliminate inconsistencies in the warped image, the image alignment system 100 refines the shared borders of the transformed local regions. Specifically, when the image alignment system 100 transforms (i.e., warps) the subsequent image 106 based on the plurality of homographies to generate the new aligned image (e.g., new aligned image 116 (FIG. 1)), the image alignment system 100 can refine the shared borders 1002 of corresponding local regions of the subsequent image 106 by interpolating homography flow vectors of the homographies that are proximate to the shared borders 1002. For example, the image alignment system 100 can refine the transformation of the subsequent image 106 near shared borders 1002 of the corresponding local regions 107. In particular, for each pixel location of the subsequent image 106 within a predefined distance (d) from a given shared border 1002, the image alignment system 100 determines multiple motion vectors based on the determined homographies ($H_1$ and $H_2$) of the corresponding local regions sharing the given shared border 1002. Furthermore, the image alignment system 100 determines weights of each of the pixel locations within the predefined distance (d). In particular, for a given pixel location ($P_1$), its weights are inversely proportional to distances ($w_1$ and $w_2$) of the given pixel location from respective local regions' centers 1004 and 1006. Moreover, based on the determined multiple motion vectors and determined weight of the pixel location, the image alignment system 100 averages the motion vectors with the weight to determine a new homography flow vector ($H_P$) of the pixel location ($P_1$). For example, the new homography flow vector ($H_P$) of the pixel location ($P_1$) can be defined as follows:

$$H_P = w_1 \times P_1(H_1) + w_2 \times P_1(H_2)$$

Furthermore, the image alignment system 100 can determine new homography flow vectors for each of the pixel locations within the predefined distance (d) of shared borders 1002 of the corresponding local regions of the subsequent image 106. Based on the determined new homography flow vectors for each of the pixel locations within the predefined distance (d) of shared borders 1002 of the corresponding local regions of the subsequent image 106, the image alignment system 100 can warp the subsequent image 106 to generate the new aligned image 116 (e.g., the new aligned image 116) with refined borders.

Figure 11:
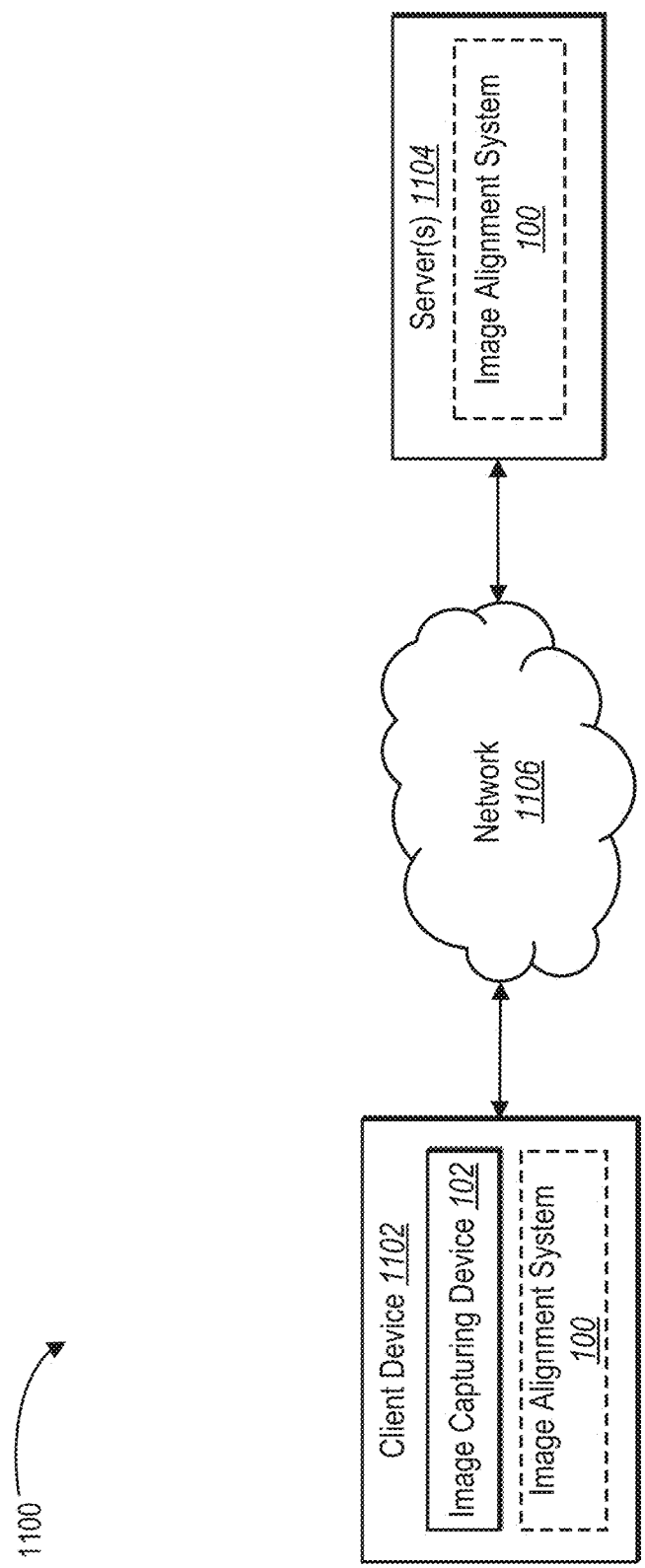
FIG. 11 illustrates a schematic diagram of one embodiment of an exemplary environment in which an image alignment system can operate according to one or more embodiments of the present disclosure.

FIG. 11 illustrates a schematic diagram of one embodiment of an exemplary environment 1100 in which the image alignment system 100 can operate. In one or more embodiments, the exemplary environment 1100 includes one or more client devices 1102, a network 1106, and server(s) 1104. The client device 1102 and the server(s) 1104 communicate via the network 1106. The network 1106 may be any suitable network over which the computing devices can communicate. Example networks are discussed in more detail below with regard to FIG. 17. Although FIG. 11 illustrates a particular arrangement of the client device 1102, the server 1104, and the network 1106, various additional arrangements are possible. For example, the server 1104 can directly communicate with the client device 1102, bypassing the network 1106.

Both the client device 1102 and the server 1104 can represent various types of computing devices with which users can interact. For example, the client device 1102 can be a mobile device (e.g., a cell phone, a smartphone, a PDA, a tablet, a laptop, a watch, a wearable device, etc.). In some embodiments, however, the client device 1102 can be a non-mobile device (e.g., a desktop or server). In addition, the server 1104 can be any type of server computing device. In one or more embodiments, the image alignment system 100 operates on the client device 102. Accordingly, the image alignment system 100 can either perform an online or offline workflow according to the principles described below. Furthermore, the client device 1102 includes an image-capturing device 102, which can supply burst images to the image alignment system 100. In alternative embodiments, as illustrated, the image alignment system 100 can operate on the server(s) 1104. Additional details with respect to the client device 1102 and the server 1104 are discussed below with respect to FIG. 17.

As noted above, in one or more embodiments, the server(s) 1104 can include all, or a portion of, the image alignment system 100. In particular, the image alignment system 100 can comprise an application running on the server(s) 1104 or a portion of a software application that can be downloaded from the server(s) 1104. For example, the image alignment system 100 can include a web hosting application that allows the client devices 1102 to interact with content hosted at the server(s) 1104. To illustrate, in one or more embodiments of the exemplary environment 1100, the client device 1102 can access a webpage supported by the server(s) 1104. In particular, the client device 1102 can run an application to allow a user to access, view, and/or interact with a webpage or website hosted at the server(s) 1104.

In one or more embodiments, the server(s) 1104 include an image manipulation system, including but not limited to ADOBE® PHOTOSHOP® software ADOBE® INDESIGN® or ADOBE® LIGHTROOM® software. The image manipulation system can access or include the image alignment system 100.

Similarly, although the environment 1100 of FIG. 11 is depicted as having various components, the environment 1100 may have additional or alternative components. For example, the image alignment system 100 can be implemented on a single computing device. In particular, the image alignment system 100 may be implemented in whole by the client device 1102 or the image alignment system 100 may be implemented in whole by the server(s) 1104. Alternatively, the image alignment system 100 may be implemented across multiple devices or components (e.g., utilizing the client device 1102 and the server(s) 1104).

By way of example, in one or more embodiments, the client device 1102 can send a request to the server(s) 1104 to align an image from a plurality of burst images. The server(s) 1104 can provide access to image alignment system 100 to the client device 1102. In response to the request, the image alignment system 100 can determine the new aligned image 116 (e.g., the new aligned image 116), as discussed above in regard to FIGS. 1-10, and the server(s) 1104 can send the new aligned image 116 to the client device 1102.

Figure 12:
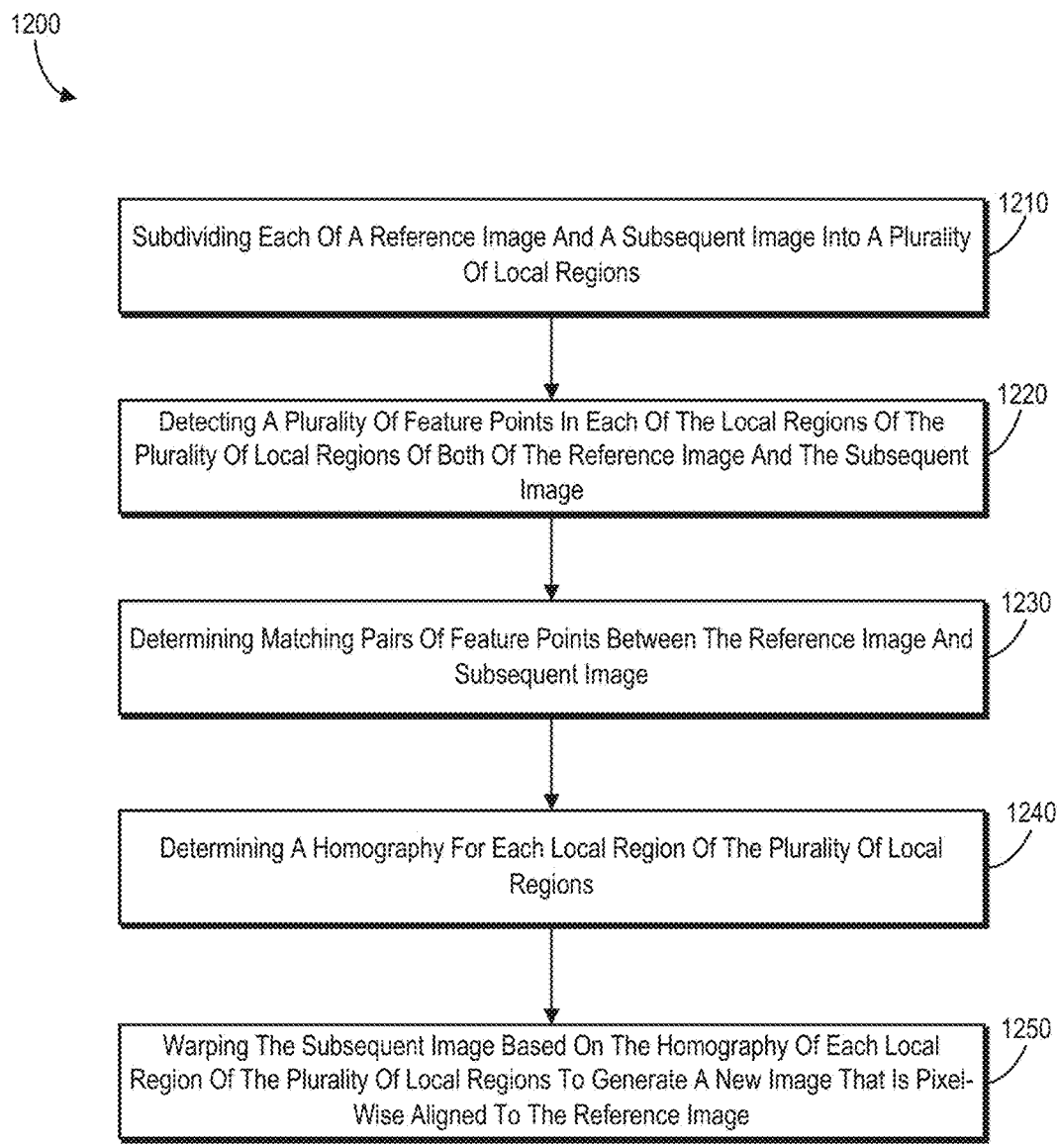
FIG. 12 illustrates a flowchart of an example method for generating a new aligned image from a plurality of burst images according to one or more embodiments of the present disclosure.

FIG. 12 illustrates a flowchart of an example method 1200 for generating a new aligned image 116 from a plurality of burst images. The method 1200 can be implemented by the image alignment system 100 described above. The method 1200 involves an act 1210 of subdividing a reference image 104 and a subsequent image 106. For example, act 1210 can include subdividing each of a reference image 104 and a subsequent image 106 into a plurality of local regions. Additionally, the act 1210 can include subdividing the reference image 104 into at least four local regions and the subsequent image 106 into at least four corresponding local regions. Furthermore, the act 1210 can include subdividing the reference image 104 and the subsequent image 106 using a 2×2 spatial grid. Likewise, the act 1210 can include subdividing the reference image 104 and the subsequent image 106 using a 4×4 spatial grid. Moreover, the act 1210 may include any of the actions described above in regard to FIGS. 5 and 6.

The method 1200 may further include an act 1220 of detecting feature points 108 within the reference image 104 and the subsequent image 106. Specifically, the act 1220 can include detecting a plurality of feature points 108 in each of the local regions of the plurality of local regions of both of the reference image 104 and the subsequent image 106. In some instances, the act 1220 can include detecting a plurality of feature points 108 comprises utilizing an oriented FAST and rotated BRIEF feature point detector and descriptor to detect the plurality of feature points 108. Furthermore, the act 1220 can include detecting a top 100 feature points having highest confidence values from each of the local regions of the plurality of local regions. Moreover, the act 1220 can include any of the actions described above in regard to FIG. 2.

Additionally, the method 1200 includes an act 1230 of determining matching pairs 112 of feature points 108. In particular, the act 1230 may include determining matching pairs 112 of feature points 108 between the reference image 104 and the subsequent image 106. In some embodiments, the act 1230 can determining feature points that are most similar to each other based at least partially on a Hamming distance between the feature descriptors 110 of the feature points 108. Additionally, the act 1230 can include any of the actions described above in regard to FIGS. 2-4.

Moreover, the method 1200 includes an act 1240 of determining at least one homography of the reference image 104 to the subsequent image 106. For example, the act 1240 may include, based on the matching pairs 112 of feature points 108, performing a step for determining a homography for each local region of the plurality of local regions, the homography of each local region mapping feature points 108 from a local region of the reference image 104 to a corresponding local region of the subsequent image 106. Additionally, the act 1240 may include any of the actions described above in regard to steps FIGS. 5 and 6.

Furthermore, the method 1200 includes an act 1250 of warping the subsequent image 106. For instance, the act 1250 can include warping the subsequent image 106 based on the homography of each local region of the plurality of local regions to generate a new aligned image 116 that is pixel-wise aligned to the reference image 104.

In some embodiments, the method 1200 can also involve an act of determining a feature descriptor 110 for each feature point of the plurality of feature points 108. Additionally, the method 1200 can include any of the actions described above in regard to FIGS. 1-10.

Figure 13:
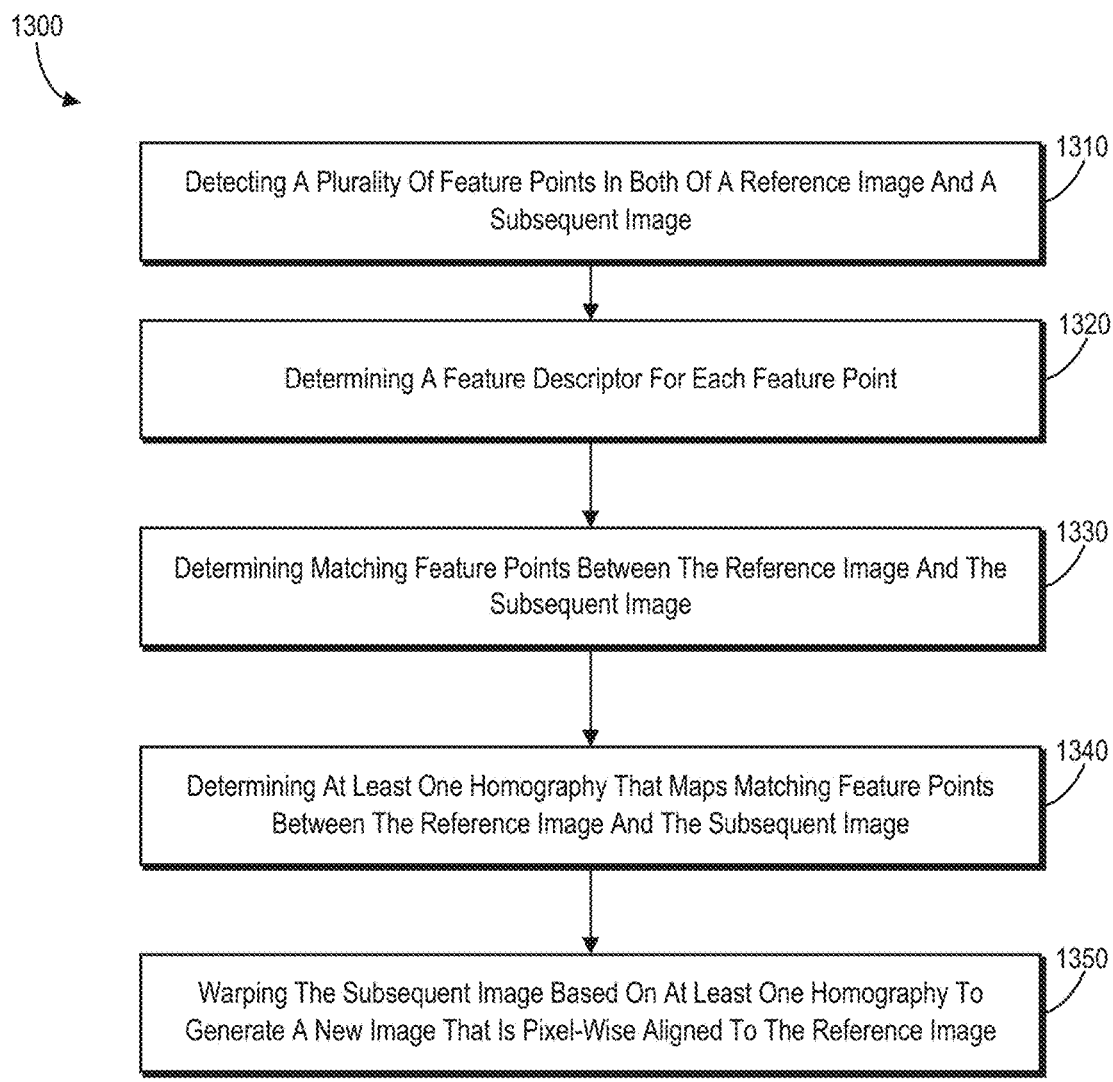
FIG. 13 illustrates a flowchart of another example method for generating a new aligned image from a plurality of burst images according to one or more embodiments of the present disclosure.

FIG. 13 illustrates a flowchart of an example method 1300 for generating a new aligned image 116 from a plurality of burst images. The method 1300 can be implemented by the image alignment system 100 described above. The method 1300 involves an act 1310 of detecting feature points 108 within a reference image 104 and a subsequent image 106 and respective feature descriptors 110. For example, act 1310 can include detecting a plurality of feature points 108 in both of a reference image 104 and a subsequent image 106.

The method 1300 also involves an act 1320 of determining a feature descriptor for each feature point. For example, act 1320 can involve analyzing the detected feature points and generating a descriptor vector for each detected feature point that encodes intensity information, pixel location information, and local neighborhood information regarding its respective feature point.

Additionally, the method 1300 involves an act 1330 of determining matching feature points 108 pairs. For example, act 1330 can include based on the feature descriptor 110 of each feature points 108, determining matching feature points 108 between the reference image 104 and the subsequent image 106. Also, act 1330 can include determining, from the set of potentially matching feature points, a median displacement vector from the pixel location of the given feature point and filtering, from the set of potentially matching feature points 108, feature points 108 having a displacement that deviates from the median displacement vector by more than a predetermined number of pixels. Additionally, the act 1330 may include any of the actions described above in regard to FIG. 4.

Additionally, act 1330 can include predicting a pixel location of a given feature. In particular, act 1330 can include predicting for a given feature point having a pixel location in the reference image 104 a corresponding pixel location in the subsequent image 106. Furthermore, in some embodiments, act 1330 can identifying a set of potentially matching feature points 108. For instance, act 1330 can include comparing a feature descriptor of the given feature point with feature descriptors 110 of feature points 108 having a pixel location within a predetermined number of pixels of the predicted corresponding pixel location in the subsequent image 106 to identify a set of potentially matching feature points 108. Also, act 1330 can include sorting feature points 108 within the predetermined number of pixels of the predicted corresponding pixel location according to the feature points' similarities with the given feature point and filtering, from the sorted feature points 108, all but a predetermined number of most similar feature points 108. Additionally, act 1330 can include filtering, from the sorted feature points 108, all but a three most similar feature points 108 and/or sorting the feature points 108 according to a Hamming distance between the feature descriptors 110 of the feature points 108 and the feature descriptor of the given feature point.

Additionally, in some embodiments, act 1330 can include filtering feature points 108 from the set of potentially matching feature points 108. For example, act 1330 can include filtering, from the set of potentially matching feature points 108, any feature points within the predetermined number of pixels of the predicted corresponding pixel location in the subsequent image 106 having a descriptor distance above a threshold distance from the given feature point. Likewise, act 1330 can include selecting a matching feature point. In particular, act 1360 can include selecting a matching feature point from the set of potentially matching feature points 108 having a highest similarity score as a match to the given feature point.

Method 1300 can further include an act 1340 of determining a homography of the reference image 104 to the subsequent image 106. For instance, act 1340 can include determining at least one homography that maps matching feature points 108 between the reference image 104 and the subsequent image 106. Additionally, the act 1340 may include any of the actions described above in regard to FIGS. 5 and 6.

Likewise, method 1300 can include an act 1350 of warping the reference image 104. For example, act 1350 can include warping the subsequent image 106 based on the at least one homography to generate a new aligned image 116 that is pixel-wise aligned to the reference image 104.

Figure 14:
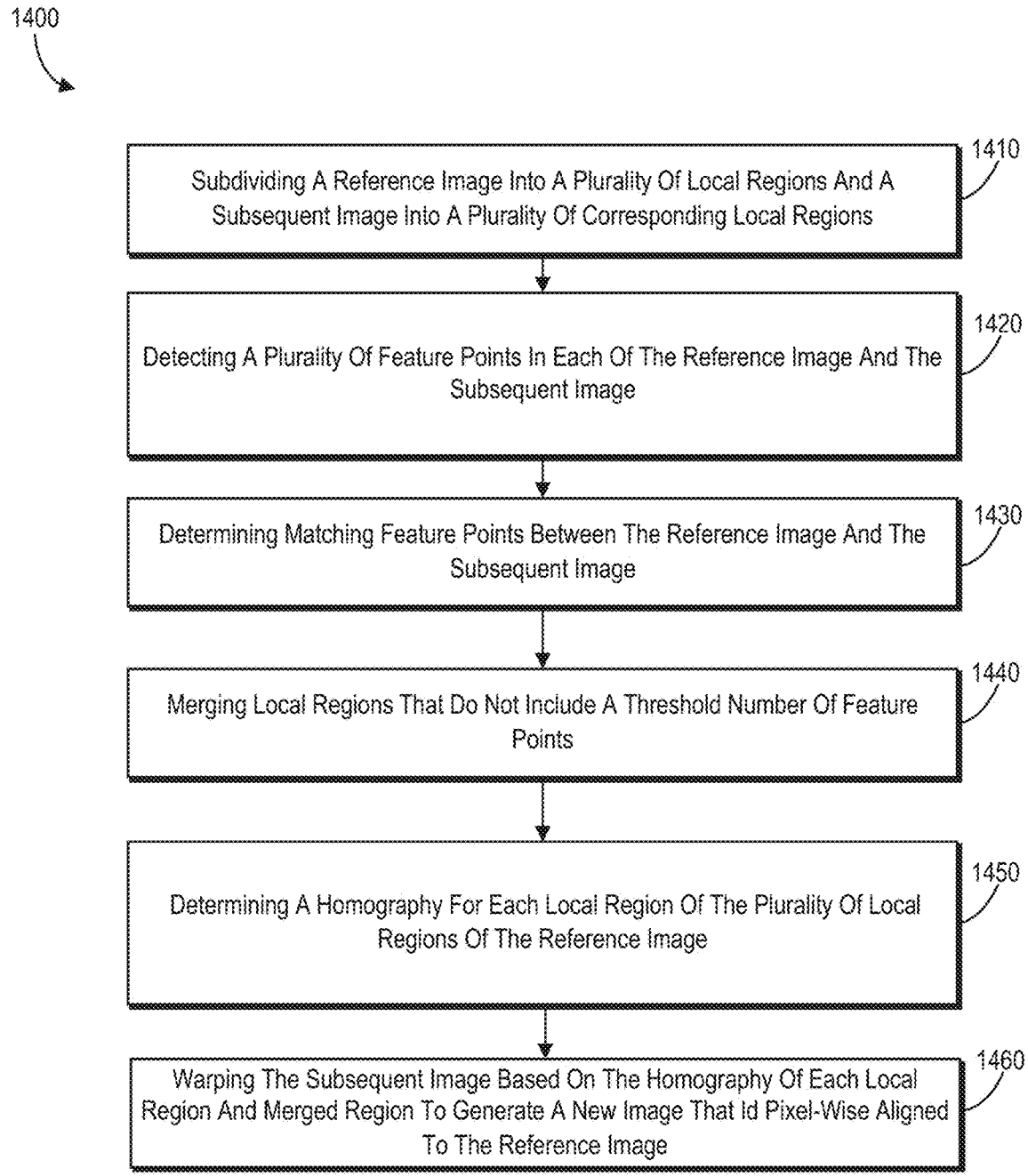
FIG. 14 illustrates a flowchart of another example method for generating a new aligned image from a plurality of burst images according to one or more embodiments of the present disclosure.

FIG. 14 illustrates a flowchart of an example method 1400 for generating a new aligned image 116 from a plurality of burst images. The method 1400 can be implemented by the image alignment system 100 described above. The method 1400 involves an act 1410 of subdividing a reference image 104 and a subsequent image 106. For example, act 1410 can include subdividing a reference image 104 into a plurality of local regions and a subsequent image 106 into a plurality of corresponding local regions. In some instances, act 1410 can include subdividing the reference image 104 into at least four local regions and subdividing the subsequent image 106 into at least four corresponding local regions. Additionally, act 1410 can include subdividing the reference image 104 and the subsequent image 106 using a 2×2 spatial grid and/or subdividing the reference image 104 and the subsequent image 106 using a 4×4 spatial grid. Moreover, the act 1410 may include any of the actions described above in regard to FIGS. 5 and 6.

The method 1400 further involves an act 1420 of detecting feature points 108 in both of the reference image 104 and the subsequent image 106. For example, act 1420 can include detecting a plurality of feature points 108 in each of the local regions of the plurality of local regions of the reference image 104 and in each of the corresponding local regions of the plurality of corresponding local regions of the subsequent image 106. Additionally, act 1420 can include any of the action described above in regard to FIGS. 2 and 3.

Additionally, the method 1400 involves an act 1430 of determining matching feature points 108. In particular, the act 1430 can include determining matching feature points 108 between the reference image 104 and the subsequent image 106. In some embodiments, the act 1430 can determining feature points that are most similar to each other based at least partially on a Hamming distance between the feature descriptors 110 of the feature points 108. Additionally, the act 1430 can include any of the actions described above in regard to FIGS. 2-4.

Furthermore, the method 1400 involves an act 1440 of merging location regions that do not include a threshold number of feature points. Additionally, the act 1440 can include determining whether each local region of the plurality of local regions of the reference image 104 includes at least a predetermined number of feature points 108. Likewise, the act 1440 can include, if a local region of the plurality of local regions of the reference image 104 does not include the at least predetermined number of feature points 108, merging the local region with an additional local region of the plurality of local regions to form a merged local region.

Furthermore, the method 1400 involves an act 1450 of determining a homography for each local region. For instance, the act 1450 can include, based on the matching feature points 108 between the reference image 104 and the subsequent image 106, determining a homography for each local region of the plurality of local regions of the reference image 104, the homography of each local region mapping feature points 108 from a respective local region of the reference image 104 to a respective corresponding local region of the subsequent image 106. Furthermore, the act 1450 can include, if a local or merged local region of the plurality of local regions of the reference image 104 includes the at least predetermined number of feature points 108, determining the homography of the local region. In some embodiments, the act 1440 can include fitting a robust homography motion model to the merged local region.

Additionally, the act 1440 may include any of the actions described above in regard to steps FIGS. 5 and 6.

Method 1400 can further include an act 1460 of warping the subsequent image 106. For example, act 1460 can include warping the subsequent image 106 based on the homography of each local region and merged local region to generate a new aligned image 116 that is pixel-wise aligned to the reference image 104.

In some embodiments, the method 1400 can also involve determining whether corners of the new aligned image 116 corresponding to contiguous corners of the plurality of local regions of the reference image 104 are contiguous. If the corners of the new aligned image 116 are not contiguous, determining average coordinates 904 of the noncontiguous corners of the new aligned image 116, and determining a homography of each of the local regions of the plurality of local regions of the reference image 104 utilizing the determined average coordinates 904 as coordinates of the contiguous corners. Furthermore, the method 1400 can include, based on the determined homography of each of the local regions of the reference image 104 and associated flow vectors of each pixel, interpolating the flow vectors of pixels proximate boundaries shared by multiple local regions of the plurality of local regions.

Figure 15:
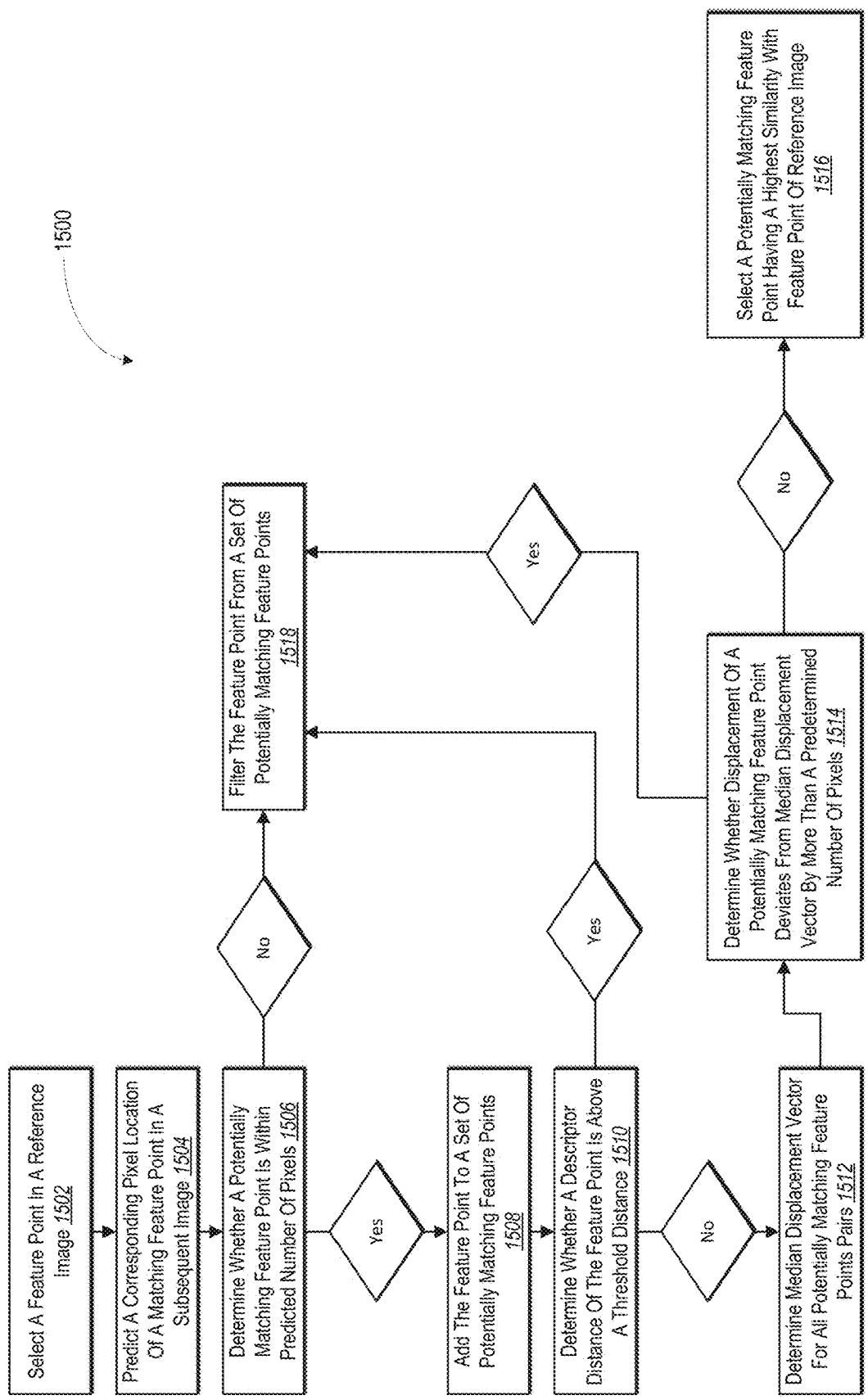
FIG. 15 illustrates a diagram of an algorithm for performing a step for matching feature points between a reference image and the subsequent image according to one or more embodiments of the present disclosure.

FIG. 15 illustrates a diagram of an algorithm for performing a step for 1500 matching feature points 108 between a reference image 104 and the subsequent image 106 according to one or more embodiments of the present disclosure. Furthermore, the step for 1500 can include any of the actions described below in regard to boxes 1502-1516. As illustrated in box 1502, the algorithm includes selecting a feature point in a reference image 104. In particular, the image alignment system 100 can detect a plurality of feature points 108 in each the reference image 104 and the subsequent image 106. Furthermore, the algorithm can include any of the actions described above in regard to FIGS. 2 and 3.

Additionally, the algorithm includes predicting a corresponding pixel location of a matching feature point of the selected feature point of the reference image 104 in a subsequent image 106, as shown in box 1504. For example, for a given feature point of the reference image 104 having pixel location $X_R$, the image alignment system 100 predicts the matching feature point's pixel location as $X_R\, dX_R$ within the subsequent image 106, where $dX_R$ is a prior motion offset, as described above in regard to FIG. 4. Predicting the corresponding pixel location can include any of the actions described above in regard to FIG. 4.

Furthermore, as illustrated in box 1506, the algorithm includes determining whether potentially matching feature points (i.e., candidate feature points) of the subsequent image 106 are within a particular number of pixels of the predicted matching feature point's pixel location. Specifically, the image alignment system 100 can determine whether potentially matching feature points are within, for example, 50 pixels of the predicted matching feature point's pixel location. Determining whether potentially matching feature points of the subsequent image 106 are within a particular number of pixels of the predicted matching feature point's pixel location can include any of the actions described above in regard to FIG. 4.

If the image alignment system 100 determines that a given feature point of the potentially matching feature points of the subsequent image 106 is not within the predetermined number of pixels, the algorithm can include filtering the given feature point from a set of potentially matching feature points, as shown in box 1518. For example, the image alignment system 100 filters the given feature point from the set of potentially matching feature points (For instance, the image alignment system 100 removes the given feature point from consideration as a matching feature point.

If the image alignment system 100 determines that given feature point of the subsequent image 106 is within the predetermined number of pixels, the algorithm includes adding the given feature point to a set of potentially matching feature points, as illustrated in box 1508. For example, the image alignment system 100 adds the given feature point to the set of potentially matching feature points. Furthermore, upon adding the given feature point to the set of potentially matching feature points, the image alignment system 100 determines whether a descriptor distance of the feature point is above a threshold distance, as shown in box 1510. For instance, the image alignment system 100 determines the similarity of two given feature points by evaluating the Hamming distance between the descriptors of the feature points.

If the image alignment system 100 determines that the descriptor distance of the feature point is above a threshold distance, the image alignment system 100 filters the given feature point from the set of potentially matching feature points, as shown in box 1518. On the other hand, if the image alignment system 100 determines that the descriptor distance of the feature point is not above a threshold distance, the image alignment system 100 determines a median displacement vector for all potentially matching pairs of feature points of the reference image 104 and the subsequent image 106, as illustrated in box 1512. Specifically, from all the remaining potentially matching feature points for all the detected feature points in the reference image 104, the image alignment system 100 determines a median displacement vector D as a median value of feature displacement $\{X_P - X_R\}$.

Upon determining the median value of feature displacement $\{X_P - X_R\}$, the image alignment system 100 determines whether a displacement of remaining potentially matching feature points deviate from the median displacement vector by more than a predetermined number of pixels, as shown in box 1514. Furthermore, if the image alignment system 100 determines that a displacement of a remaining potentially matching feature point deviates from the median displacement vector by more than a predetermined number of pixels, the image alignment system 100 filters the given feature point from the set of potentially matching feature points, as shown in box 1518. On the other hand, if the image alignment system 100 determines that a displacement of a remaining potentially matching feature point does not deviate from the median displacement vector by more than a predetermined number of pixels, the image alignment system 100 selects a matching feature point from the remaining potentially matching feature points (i.e., the candidate feature points) having a highest similarity with the feature point of the reference image 104, as shown in box 1516. As discussed above, the matching feature point of the subsequent image 106 and the given feature point of the reference image 104 form a matching feature point pair.

Figure 16:
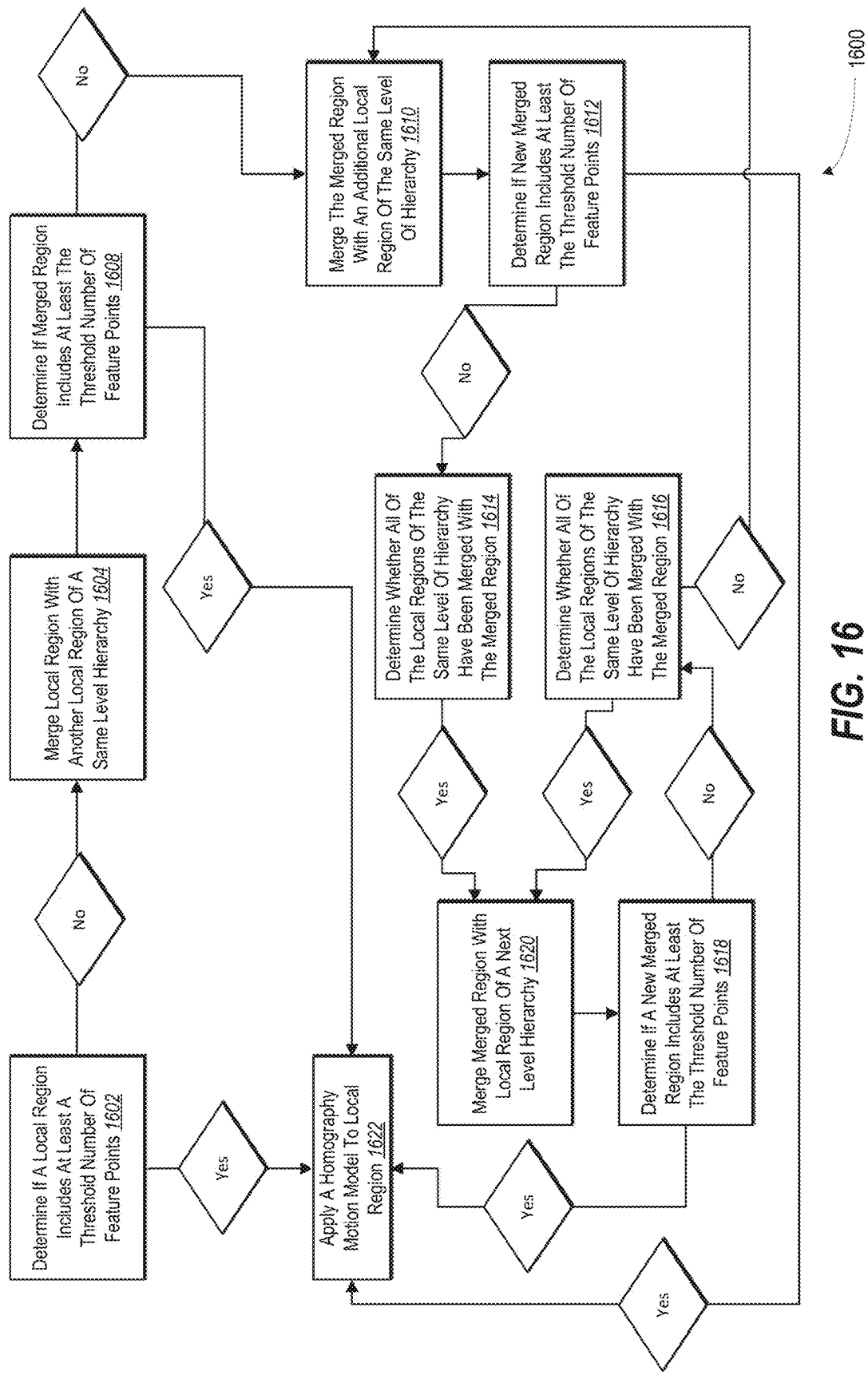
FIG. 16 illustrates a diagram of an algorithm for performing a step for matching feature points between a reference image and the subsequent image according to one or more embodiments of the present disclosure.

FIG. 16 illustrates a diagram of an algorithm for performing a step for 1600 matching feature points between a reference image 104 and the subsequent image 106 according to one or more embodiments of the present disclosure. For example, the step for 1600 can include any of the action described below in regard to boxes 1602-1622. As illustrated in box 1602, the algorithm includes determining if a local region (or corresponding local region) includes at least a threshold number of feature points. Specifically, the image alignment system 100 can determine whether a local region of the reference image 104 include a threshold number of detected feature points. As noted above, the threshold number can include 50, 75, 100, 200, 500, 1000, or any other number of detected feature points. Furthermore, the algorithm can include any of the actions described above in regard to FIGS. 5 and 6.

For example, on one hand, as illustrated in box 1622, if the image alignment system 100 determines that the local region does include the threshold number of detected feature points, the algorithm can include applying a homography motion model to the local region. For example, the image alignment system 100 can apply a homography motion model to the local region in any of the methods described above in regard to FIGS. 5-7.

If, on the other hand, as shown in box 1604, the image alignment system 100 determines that the local region does not include the threshold number of detected feature points, the algorithm can include merging the local region with another local region of the same level of hierarchy. For example, the image alignment system 100 can merge the local region with another local region of the same level of hierarchy. The levels of hierarchy are described in detail above in regard to FIGS. 5 and 6. Furthermore, merging the local region with another local region of the same level of hierarchy can include any of the actions described above in regard to FIGS. 5 and 6.

As illustrated in box 1608, upon merging the local region with another local region, the algorithm includes determining if the resulting merged local region includes at least the threshold number of feature points. For example, the image alignment system 100 determines if the resulting merged local region includes at least the threshold number of feature points. If the image alignment system 100 determines that the merged local region includes at least the threshold number of feature points, the algorithm includes applying a homography motion model to the merged local region, as shown in box 1622. For example, the image alignment system 100 can apply a homography motion model to the merged local region in any of the methods described above in regard to FIGS. 5-7.

If, alternatively, the image alignment system 100 determines that the merged local region does not include at least the threshold number of feature points, the algorithm includes merging the merged local region with an additional local region of the same level of hierarchy, as shown in box 1610. Specifically, the image alignment system 100 merges the merged local region with an additional local region of the same level of hierarchy. As noted above, the levels of hierarchy are described above in regard to FIGS. 5 and 6.

As illustrated in box 1612, upon merging the merged local region with an additional local region, the algorithm includes determining if the resulting new merged local region includes at least the threshold number of feature points. For example, the image alignment system 100 determines if the resulting new merged local region includes at least the threshold number of feature points. If the image alignment system 100 determines that the new merged local region includes at least the threshold number of feature points, the algorithm includes applying a homography motion model to the new merged local region, as shown in box 1622. For example, the image alignment system 100 can apply a homography motion model to the merged local region in any of the methods described above in regard to FIGS. 5-7.

If, alternatively, the image alignment system 100 determines that the resulting merged local region does not include at least the threshold number of feature points, the algorithm includes determining whether all of the local regions of the same level of hierarchy have been merged with the new merged local region, as shown in box 1614. Specifically, the image alignment system 100 determines whether all of the local regions of the same level of hierarchy have been merged with the new merged local region. If the image alignment system 100 determines that not all of the local regions of the same level of hierarchy have been merged with the new merged local region, the algorithm includes merging the merged local region with an additional local region of the same level (e.g., the lowest level (FIG. 6)) of hierarchy, as shown in box 1610. Specifically, the image alignment system 100 merges the new merged local region with an additional local region of the same level of hierarchy. As noted above, the levels of hierarchy are described above in regard to FIGS. 5 and 6.

If, on the other hand, the image alignment system 100 determines all of the local regions of the same level of hierarchy have been merged with the new merged local region, the algorithm includes merging the new merged local region with a local region of a next level of hierarchy (e.g., the first level up (FIG. 6)), as illustrated in box 1620. Specifically, the image alignment system 100 merges the new merged local region with a local region of the next level of hierarchy. As noted above, the levels of hierarchy are described above in regard to FIGS. 5 and 6.

As illustrated in box 1618, upon merging the new merged local region with a local region of the next level of hierarchy, the algorithm includes determining if the resulting merged local region includes at least the threshold number of detected feature points. For example, the image alignment system 100 determines if the resulting merged local region includes at least the threshold number of detected feature points. If the image alignment system 100 determines that the resulting merged local region includes at least the threshold number of feature points, the algorithm includes applying a homography motion model to the resulting merged local region, as shown in box 1622. For example, the image alignment system 100 can apply a homography motion model to the resulting merged local region in any of the manners described above in regard to FIGS. 5-7.

If, alternatively, the image alignment system 100 determines that the resulting merged local region does not include at least the threshold number of feature points, the algorithm includes determining whether all of the local regions of the same level of hierarchy (e.g., the first level up (FIG. 6)) have been merged with the resulting merged local region, as shown in box 1616. Specifically, the image alignment system 100 determines whether all of the local regions of the same level of hierarchy have been merged with the resulting merged local region. If the image alignment system 100 determines that not all of the local regions of the same level of hierarchy have been merged with the merged local region, the algorithm includes merging the resulting merged local region with an additional local region of the same level of hierarchy (e.g., the first level up (FIG. 6)), as shown in box 1610. Specifically, the image alignment system 100 merges the resulting merged local region with an additional local region of the same level of hierarchy. As noted above, the levels of hierarchy are described above in regard to FIGS. 5 and 6.

If, on the other hand, the image alignment system 100 determines that all of the local regions of the same level of hierarchy have been merged with the resulting merged local region, the algorithm includes merging the resulting merged local region with a local region of a next level of hierarchy (e.g., the second level up (FIG. 6)), as illustrated in box 1620. Specifically, the image alignment system 100 merges the resulting merged local region with a local region of the next level of hierarchy. As noted above, the levels of hierarchy are described above in regard to FIGS. 5 and 6.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
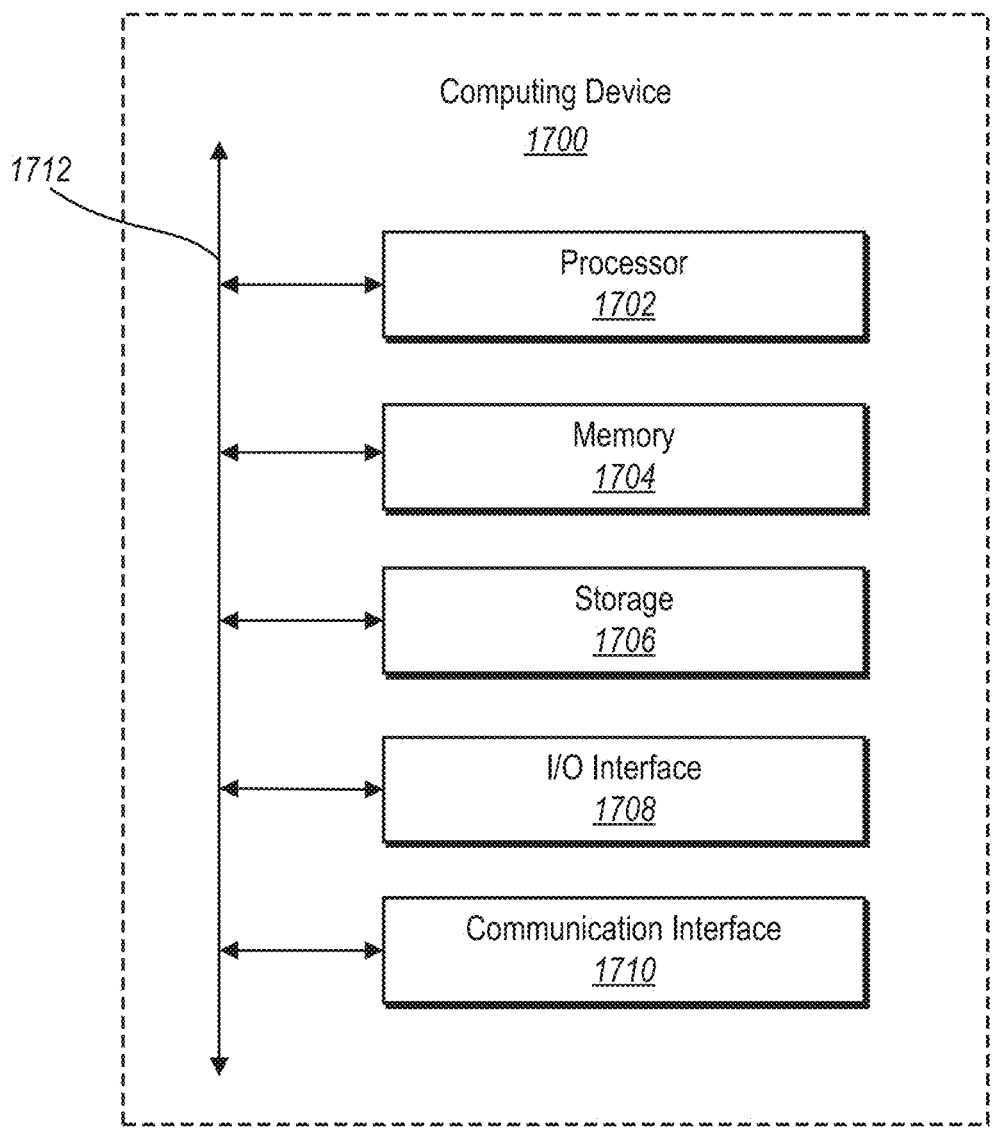
FIG. 17 illustrates a block diagram of an example computing device in accordance with one or more embodiments of the present disclosure.

FIG. 17 illustrates a block diagram of an example computing device 1700 that may be configured to perform one or more of the processes described above. One will appreciate that one or more computing devices such as the computing device 1700 may implement the image alignment system 100 and/or client device 102. As shown by FIG. 17, the computing device 1700 can comprise a processor 1702, a memory 1704, a storage device 1706, an I/O interface 1708, and a communication interface 1710, which may be communicatively coupled by way of a communication infrastructure. While an example computing device 1700 is shown in FIG. 17, the components illustrated in FIG. 17 are not intended to be limiting. Additional or alternative components may be used in other embodiments. Furthermore, in certain embodiments, the computing device 1700 can include fewer components than those shown in FIG. 17. Components of the computing device 1700 shown in FIG. 17 will now be described in additional detail.

In one or more embodiments, the processor 1702 includes hardware for executing instructions, such as those making up a computer program. As an example, and not by way of limitation, to execute instructions, the processor 1702 may retrieve (or fetch) the instructions from an internal register, an internal cache, the memory 1704, or the storage device 1706 and decode and execute them. In one or more embodiments, the processor 1702 may include one or more internal caches for data, instructions, or addresses. As an example and not by way of limitation, the processor 1702 may include one or more instruction caches, one or more data caches, and one or more translation look aside buffers (TLBs). Instructions in the instruction caches may be copies of instructions in the memory 1704 or the storage 1706.

The computing device 1700 includes memory 1704, which is coupled to the processor(s) 1702. The memory 1704 may be used for storing data, metadata, and programs for execution by the processor(s). The memory 1704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1704 may be internal or distributed memory.

The computing device 1700 includes a storage device 1706 that includes storage for storing data or instructions. As an example and not by way of limitation, storage device 1706 can comprise a non-transitory storage medium described above. The storage device 1706 may include a hard disk drive (HDD), a floppy disk drive, flash memory, an optical disc, a magneto-optical disc, magnetic tape, or a Universal Serial Bus (USB) drive or a combination of two or more of these. The storage device 1706 may include removable or non-removable (or fixed) media, where appropriate. The storage device 1706 may be internal or external to the computing device 1700. In one or more embodiments, the storage device 1706 is non-volatile, solid-state memory. In other embodiments, the storage device 1706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1700 also includes one or more input or output ("I/O") devices/interfaces 1708, which are provided to allow a user to provide input to, receive output from, and otherwise transfer data to and receive data from computing device 1700. The I/O devices/interfaces 1708 may include a mouse, a keypad or a keyboard, a touch screen, a camera, an optical scanner, network interface, modem, other known I/O devices or a combination of such I/O device/interfaces. The touch screen may be activated with a stylus or a finger.

The I/O devices/interfaces 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1708 is configured to provide graphical data to a display for presentation to a user. The graphical data may be representative of one or more graphical user interfaces and/or any other graphical content as may serve a particular implementation.

The computing device 1700 can further include a communication interface 1710. The communication interface 1710 can include hardware, software, or both. The communication interface 1710 can provide one or more interfaces for communication (such as, for example, packet-based communication) between the computing device 1700 and one or more other computing devices or networks. As an example and not by way of limitation, the communication interface 1710 may include a network interface controller (NIC) or network adapter for communicating with an Ethernet or other wire-based network or a wireless NIC (WNIC) or wireless adapter for communicating with a wireless network, such as a WI-FI. The computing device 1700 can further include a bus 1712. The bus 1712 can comprise hardware, software, or both that couples components of computing device 1700 to each other.

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this invention. Indeed, various modifications of the present disclosure, in addition to those shown and described herein, such as alternative useful combinations of the content features described, may become apparent to those skilled in the art from the description. Such modifications and embodiments are also intended to fall within the scope of the appended claims and legal equivalents.

We claim:

1. A computer-implemented method of generating aligned images from burst images, the method comprising:
    detecting a plurality of feature points in a reference image and a subsequent image;
    determining a feature descriptor for each feature point of the plurality of feature points;
    based on the feature descriptor of each feature point, determining matching feature points between the reference image and the subsequent image;
    determining at least one homography that maps matching feature points between the reference image and the subsequent image, wherein determining at least one homography comprises applying a homography motion model to a plurality of local regions individually to determine a homography for each local region that maps feature points in a local region of the reference image to feature points in a corresponding local region of the subsequent image; and
    warping the subsequent image based on the at least one homography to generate a new aligned image that is aligned to the reference image.

2. The computer-implemented method of claim 1, wherein determining a feature descriptor for each feature point of the plurality of feature points comprises analyzing the detected feature points and generating a descriptor vector for each detected feature point that encodes intensity information, pixel location information, and local neighborhood information regarding its respective feature point.

3. The computer-implemented method of claim 1, wherein determining matching feature points between the reference image and the subsequent image comprises:
    predicting for a given feature point having a pixel location in the reference image a corresponding pixel location in the subsequent image;
    identifying a set of potentially matching feature points from the subsequent image;
    filtering, from the set of potentially matching feature points, any feature points having a descriptor distance above a threshold distance from the given feature point; and
    selecting a matching feature point from the set of potentially matching feature points having a highest similarity score as a match to the given feature point.

4. The computer-implemented method of claim 3, wherein identifying the set of potentially matching feature points from the subsequent image comprises comparing a feature descriptor of the given feature point with feature descriptors of feature points having a pixel location within a predetermined number of pixels of the predicted corresponding pixel location in the subsequent image.

5. The computer-implemented method of claim 4, wherein identifying the set of potentially matching feature points comprises:
    sorting feature points within the predetermined number of pixels of the predicted corresponding pixel location according to the feature points' similarities with the given feature point; and
    filtering, from the sorted feature points, all but a predetermined number of most similar feature points.

6. The computer-implemented method of claim 5, wherein filtering, from the sorted feature points, all but the predetermined number of most similar feature points comprises filtering, from the sorted feature points, all but a three most similar feature points.

7. The computer-implemented method of claim 5, wherein sorting feature points within the predetermined number of pixels of the predicted corresponding pixel location according to the feature points' similarities with the given feature point comprises sorting the feature points according to a Hamming distance between the feature descriptors of the feature points and the feature descriptor of the given feature point.

8. The computer-implemented method of claim 3, determining matching feature points between the reference image and the subsequent image further comprises:
    determining, from the set of potentially matching feature points, a median displacement vector from the pixel location of the given feature point; and
    filtering, from the set of potentially matching feature points, feature points having a displacement that deviates from the median displacement vector by more than a predetermined number of pixels.

9. The computer-implemented method of claim 8, wherein warping the subsequent image based on the at least one homography to generate a new aligned image that is aligned to the reference image comprises warping the subsequent image based on the homography of each local region.

10. A system for generating aligned images from burst images, comprising:
    a memory comprising a references image and a subsequent image;

at least one processor communicatively coupled to the memory and storing instructions thereon, that, when executed by the at least one processor, cause the system to:
  subdivide the reference image into a plurality of local regions;
  subdivide the subsequent image into a plurality of corresponding local regions;
  detect a plurality of feature points in the local regions of the reference image;
  detect a plurality of feature points the corresponding local regions of the subsequent image;
  determine matching feature points between the reference image and the subsequent image;
  merge local regions of the reference image that do not include a threshold number of feature points with another local region of the reference image;
  based on the matching feature points between the reference image and the subsequent image, determine a homography for each local region and merged region of the reference image, the homography of each local region mapping feature points from a respective local region of the reference image to a respective corresponding local region of the subsequent image, and
  warp the subsequent image based on the homography of each local region and merged local region to generate a new aligned image that is aligned to the reference image.

11. The system as recited in claim 10, wherein the instructions when executed by the at least one processor cause the system to determine a homography for each local region of the reference image by performing steps comprising:
  determining whether each local region of the plurality of local regions of the reference image includes at least a threshold number of feature points;
  if a given local region of the reference image includes at least the threshold number of feature points, determining a homography of the given local region; and
  if a given local region of the reference image does not include at least the threshold number of feature points, merging the given local region with an additional local region of the reference image to form a merged local region and determining the homography of the merged local region.

12. The system as recited in claim 11, wherein the instructions when executed by the at least one processor cause the system to determine the homography of the merged local region by performing steps comprising fitting a robust homography motion model to the merged local region.

13. The system as recited in claim 11, wherein the instructions when executed by the at least one processor cause the system to warp the subsequent image by interpolating homography flow vectors of the homographies that are proximate to borders shared by two or more of the corresponding local regions of the subsequent image.

14. The system as recited in claim 10, further comprising instructions that when executed by the at least one processor cause the system to:
  determine whether corners of the new aligned image corresponding to contiguous corners of the plurality of local regions of the subsequent image are contiguous;
  if the corners of the new aligned image are noncontiguous, determine average coordinates of the noncontiguous corners of the new aligned image; and
  determine a homography of each of the local regions of the plurality of local regions of the reference image utilizing the average coordinates as coordinates of the contiguous corners.

15. A computer-implemented method of generating aligned images from burst images, the method comprising:
  subdividing a reference image and a subsequent image into a plurality of local regions;
  detecting a plurality of feature points in the local regions of the reference image and the subsequent image;
  determining matching pairs of feature points between the reference image and the subsequent image;
  based on the matching pairs of feature points, performing a step for determining a homography for each local region of the plurality of local regions, the homography of each local region mapping feature points from a local region of the reference image to a corresponding local region of the subsequent image; and
  warping the subsequent image based on the homography of each local region of the plurality of local regions to generate a new aligned image that is aligned to the reference image.

16. The computer-implemented method of claim 15, wherein determining matching pairs of feature points between the reference image and the subsequent image comprises determining feature points that are most similar to each other based at least partially on a Hamming distance between feature descriptors of the feature points.

17. The computer-implemented method of claim 15, wherein subdividing each of a reference image and a subsequent image comprises subdividing the reference image into at least four local regions and the subsequent image into at least four corresponding local regions.

18. The computer-implemented method of claim 17, wherein subdividing the reference image into at least four local regions and the subsequent image into at least four corresponding local regions comprises subdividing the reference image and the subsequent image using a 2×2 spatial grid.

19. The computer-implemented method of claim 15, wherein detecting a plurality of feature points comprises selecting a top number of features points having highest confidence values from each local region of the plurality of local regions.

* * * * *